(12) United States Patent
Bi et al.

(10) Patent No.: US 12,009,659 B1
(45) Date of Patent: Jun. 11, 2024

(54) SYSTEM AND METHOD OF FAULT ANALYSIS OF INVERTER-INTERFACED RENEWABLE ENERGY SOURCE CONSIDERING DECOUPLED SEQUENCE CONTROL

(71) Applicant: NORTH CHINA ELECTRIC POWER UNIVERSITY, Beijing (CN)

(72) Inventors: Tianshu Bi, Beijing (CN); Ke Jia, Beijing (CN); Qian Liu, Beijing (CN); Hao Liu, Beijing (CN); Cheng Wang, Beijing (CN)

(73) Assignee: North China Electric Power University, Beijing (CN)

( * ) Notice: Subject to any disclaimer, the term of this patent is extended or adjusted under 35 U.S.C. 154(b) by 0 days.

(21) Appl. No.: 18/203,474

(22) Filed: May 30, 2023

(51) Int. Cl.
*H02J 3/00* (2006.01)

(52) U.S. Cl.
CPC ........... *H02J 3/001* (2020.01); *H02J 2203/20* (2020.01)

(58) Field of Classification Search
CPC .............................. H02J 3/001; H02J 2203/20
See application file for complete search history.

(56) References Cited

U.S. PATENT DOCUMENTS

| | | | | |
|---|---|---|---|---|
| 8,874,424 | B2 * | 10/2014 | Nielsen | H02J 3/00125 290/44 |
| 10,615,716 | B2 * | 4/2020 | Zhong | H02J 3/01 |
| 10,938,209 | B2 * | 3/2021 | Chen | H02M 7/53876 |
| 2013/0057236 | A1 * | 3/2013 | Hsu | H02J 3/381 323/268 |

OTHER PUBLICATIONS

Liu, Q., Jia, K., Yang, B., Zheng, L., & Bi, T. (Jun. 2022). Fault Analysis of Inverter-Interfaced RESs Considering Decoupled Sequence Control. IEEE Transactions on Industrial Electronics, 70(5), 4820-4830.*

Q. Liu, K. Jia, B. Yang, L. Zheng and T. Bi, "Analytical Model of Inverter-Interfaced Renewable Energy Sources for Power System Protection," in IEEE Transactions on Power Delivery, vol. 38, No. 2, pp. 1064-1073, Apr. 2023, doi: 10.1109/TPWRD.2022.3204825.*

T. Bi, B. Yang, K. Jia, L. Zheng, Q. Liu and Q. Yang, "Review on Renewable Energy Source Fault Characteristics Analysis," in CSEE Journal of Power and Energy Systems, vol. 8, No. 4, pp. 963-972, Jul. 2022, doi: 10.17775/CSEEJPES.2021.06890.*

* cited by examiner

*Primary Examiner* — M. N. Von Buhr
(74) *Attorney, Agent, or Firm* — Hunton Andrews Kurth LLP

(57) ABSTRACT

A method for analytically studying fault responses of an inverter-interfaced renewable energy source (IIRES). The IIRES includes a decoupled sequence control (DSC) system, and the DSC system includes a converter, a current controller, a low-voltage ride-through (LVRT) control unit, and positive and negative sequence components calculation (PNSCC) structures. The method includes: determining a detailed fault model of the IIRES; determining a unified model of the PNSCC structures; determining a simplified fault model of the IIRES in a fault detection phase; determining a simplified fault model of the IIRES in a control transient response (CTR) phase; detecting a short-circuit fault; cutting off an outer loop of the DSC system; switching the DSC system to a current control mode through the LVRT unit by the current controller; analyzing the short-circuit fault; and designing an enhanced fault-ride-through control of the IIRESs to suppress an inrush current to protect the IIRES.

1 Claim, 18 Drawing Sheets

SYSTEM AND METHOD OF FAULT ANALYSIS OF INVERTER-INTERFACED RENEWABLE ENERGY SOURCE CONSIDERING DECOUPLED SEQUENCE CONTROL

FIELD OF THE INVENTION

The present disclosure relates generally to renewable energy power systems, and more particularly, to systems and methods of fault analysis of inverter-interfaced renewable energy sources considering decoupled sequence control.

BACKGROUND

The emerging inverter-interfaced renewable energy sources (IIRESs) have remarkably altered fault characteristics of a modern power system. Since IIRESs are integrated with a grid via power electronic devices, there are two critical differences distinguishing a fault response of IIRESs with that of synchronous generators. First, the fault current of IIRESs is limited to protect the costly semiconductor devices. Second, the fault current of IIRESs varies rapidly because of the fast response controllers. Hence, with such a different type of power source, traditional fault analysis methods and protection principles may no longer apply. Given this, the fault modeling of IIRESs needs to be fully studied to establish a basis for integrating the IIRES models into short-circuit analysis and supporting a protection system.

Electromagnetic transient (EMT) simulation models can give a general cognition of the IIRES's fault behavior. However, the easy access of EMT models results in the difficulty to build systematic fault analysis theories. Besides, the high dependency on numerical algorithms also restricts the industrial application of EMT models in the protection field. Thus, equivalent and analytical models of IIRESs are required.

SUMMARY

Aspects of the disclosed technology include systems and methods of fault analysis of inverter-interfaced renewable energy sources considering decoupled sequence control.

Embodiments of the present disclosure provide a method for controlling an inverter-interfaced renewable energy source (IIRES). The IIRES includes a converter, a decoupled sequence control (DSC) system and a power filter, and the DSC system includes a current controller, a low-voltage ride-through (LVRT) control unit, and a positive and negative sequence components calculation (PNSCC) structure such as a dual synchronous reference frame (DSRF)-based PNSCC structure, a dual complex-coefficient filter (DCCF)-based PNSCC structure, a dual second-order generalized integrator (DSOGI)-based PNSCC structure, a delayed signal cancellation (dsc)-based PNSCC structure, or a notch filter (NF)-based PNSCC structure. The method includes: determining a model of the PNSCC structures in a synchronous reference frame (SRF); determining transfer function for the DSRF-based PNSCC structure and the DCCF-based PNSCC structure; determining transfer function for the DSOGI-based PNSCC structure; determining transfer function for the dsc-based PNSCC structure; determining transfer function for the NF-based PNSCC structure; determining a detailed fault model of the IIRES with the DSC; by simplifying the transfer functions, determining a unified model of the PNSCC structures in the SRF; by using an inverse Laplace transform, determining a simplified fault model of the IIRES with the DSC in a fault detection phase; by using an inverse Laplace transform, determining a simplified fault model of the IIRES with the DSC in a control transient response (CTR) phase; detecting a short-circuit fault by the converter and analyzing the short-circuit fault using the simplified fault model of the IIRES with the DSC in the fault detection phase; cutting off an outer loop of the DSC system; switching the DSC system to a current control mode through the LVRT unit by the current controller, and analyzing the short-circuit fault using the simplified fault model of the IIRES with the DSC in the control transient response (CTR) phase; and designing an enhanced fault-ride-through control of the IIRESs to suppress an inrush current to protect the IIRES.

Further features of the disclosed systems and methods, and the advantages offered thereby, are explained in greater detail hereinafter with reference to specific example embodiments illustrated in the accompanying drawings

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

DETAILED DESCRIPTION

Figure 1:
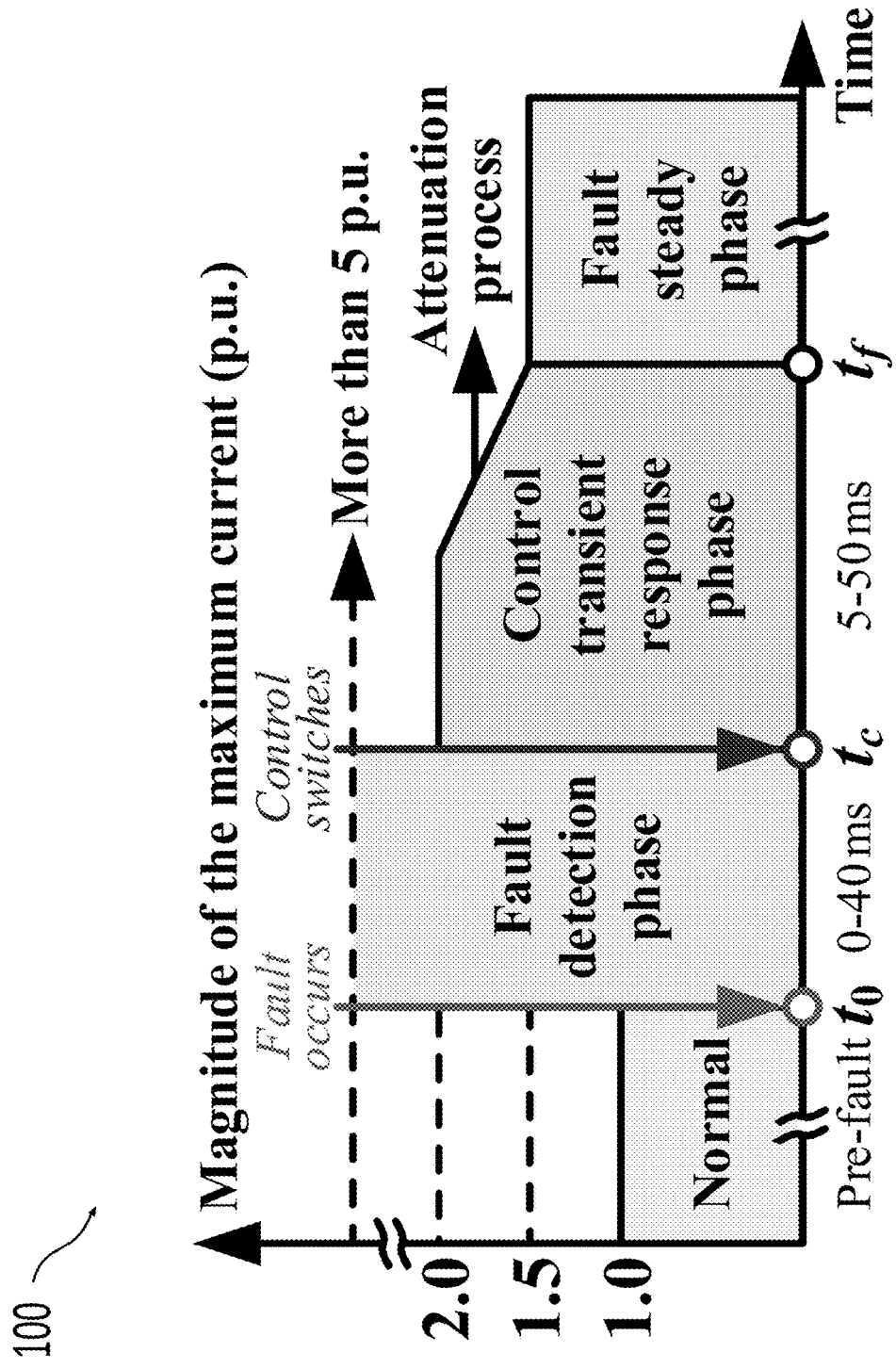
FIG. 1 illustrates a diagram of different phases of IIRESs during a fault period according to an embodiment of the present disclosure.

Exemplary embodiments of the invention will now be described in order to illustrate various features of the invention. The embodiments described herein are not intended to be limiting as to the scope of the invention, but rather are intended to provide examples of the components, use, and operation of the invention. The following description of embodiments provides non-limiting representative examples referencing numerals to particularly describe features and teachings of different aspects of the invention. The embodiments described should be recognized as capable of implementation separately, or in combination, with other embodiments from the description of the embodiments. A person of ordinary skill in the art reviewing the description of embodiments should be able to learn and understand the different described aspects of the invention. The description of embodiments should facilitate understanding of the invention to such an extent that other implementations, not specifically covered but within the knowledge of a person of skill in the art having read the description of embodiments, would be understood to be consistent with an application of the invention.

I. INTRODUCTION

In power system analysis, equivalent circuit models such as ideal current or voltage sources are typically applied to describe a fault response of IIRESs. Whereas, due to the oversimplification of these fault models, the transient phase of IIRESs' fault response can hardly be analyzed. Therefore, the calculation accuracy cannot be guaranteed.

To obtain a more comprehensive understanding of IIRESs' fault response, many researchers turn to the analytical modeling studies of IIRESs. Based on the dynamic response of a control unit, the fault response of IIRESs can be characterized as a typical second-order system in the Laplace domain. The intuitive analytical results in the time domain can be further yielded by using the inverse Laplace transform. However, such kinds of analogous models are merely applicable to IIRESs with a traditional coupled sequence control (CSC), and thus a negative sequence current control is not considered. Normally, the negative sequence fault current is important to the control and protection system of IIRESs under asymmetric faults. Hence, numerous IIRESs are now integrated to the grid with a decoupled sequence control (DSC).

In accordance with the instantaneous power theory, most of the published researches focus on the fault steady (FS) phase analysis of IIRESs with DSC, and the transient phase is ignored. A positive and negative sequence components calculation (PNSCC) mode is used to detect and extract the sequence components of IIRESs with DSC. Since filters and different feedback (or feedforward) loops are introduced to the IIRES's control system by the PNSCC mode, the transient response of IIRESs with DSC is significantly different from that of IIRESs with CSC.

An existing research tries to settle this problem and proposes an analytical model of IIRESs with DSC covering the transient analysis. However, only the dual second-order generalized integrator (DSOGI) based PNSCC method is taken into account, and thus this model is inapplicable for other various PNSCC structures. Moreover, the fault detection (FD) phase that is defined as a time period required for the IIRES to detect the short-circuit fault before the transient phase is not considered in this model. Even though it is a very short duration (usually less than 1-2 cycles), the FD phase is crucial for the fault analysis of IIRESs. Subject to the hardware restriction and field interference factors in practice, the PNSCC mode of IIRESs with DSC may vary with different manufactures and the delay in control system is also inevitable. Thus, different PNSCC modes and the complete fault phases must be fully considered in a fault modeling of IIRESs with DSC.

Promoted by this objective, the present disclosure discloses a generalized fault analysis model of IIRESs with DSC to calculate a fault response. Advantages of the present disclosure can include, but are not limited to: 1) the disclosed model provides general mathematical expressions to analyze the fault characteristics of IIRESs with DSC, which is normally implemented by the EMT simulation; 2) the control delay features caused by the PNSCC mode and FD phase are fully considered in this model, and thus the disclosed model enables a precise inrush current estimation of IIRESs with DSC; and 3) the disclosed model shows a high calculation accuracy in characterizing the short-circuit current with an error less than 7%, promising an accurate theoretical model for the calculation criterion of a protection algorithm.

Specifically, to adapt to the operation under asymmetric conditions, an increasing number of grid-following inverter-interfaced renewable energy sources (IIRESs) start to employ the decoupled sequence control (DSC). However, due to the variety and complexity of the positive and negative sequence components calculation (PNSCC) modes used for DSC, the fault response of IIRESs with DSC has rarely been studied using the analytical method. To this end, this disclosure discloses a Laplace domain fault modeling method to investigate fault characteristics of IIRESs with DSC. The high-order and coupling features of commonly used PNSCC modes are analyzed, and then they are taken into account to establish a detailed fault model of IIRESs with DSC. To further apply the disclosed fault model to a practical fault analysis, different PNSCC modes are generalized to obtain a unified form, and thus a reduced-order fault model of IIRESs with DSC covering the complete fault phases can be yielded. Based on this model, contributing factors of the IIRES's fault response within different fault phases can be explored. Simulation and hardware-in-loop experiments indicate that this model can be applied to various fault scenarios with an error less than 7%, providing a theoretical foundation to support the protection scheme.

In the present disclosure, three different fault phases and a typical control system of the IIRES are introduced in Section II. Section III presents the modeling procedures of five basic PNSCC modes and the detailed fault model of IIRESs with DSC. In Section IV, different PNSCC modes are normalized with a unified low-pass filter (LPF), and thus a reduced-order fault model of the IIRES with DSC is developed. In Section V, the disclosed model is validated with numerous simulation studies including multiple fault conditions. Then, hardware-in-loop tests are performed to verify the calculation accuracy of this model. Conclusions are drawn in Section VI.

II. FAULT BEHAVIORS OF INVERTER-INTERFACED RENEWABLE ENERGY SOURCE

A. Different Fault Phases of IIRESs

FIG. 1 illustrates a diagram 100 of different phases of an IIRES during a fault period according to an embodiment of the present disclosure. The fault response of IIRESs can be normally divided into three fault phases, corresponding to a FD phase, a control transient response (CTR) phase and a FS phase, as shown in the diagram 100 in FIG. 1, where to is a time at which a fault occurs, $t_c$ is the end time of the FD phase, and the IIRES enters the FS phase at $t_f$. The FD phase depends on a FD time of a converter, varying from 0 to 40 ms. Thereafter, dominated by a current controller, the IIRES starts to track a current reference calculated by the low-voltage ride-through (LVRT) control algorithm in the CTR phase, and this transition can be about 5-50 ms. For the FS phase, it can differ with different current limiting schemes, but the fault steady-state current of IIRESs is generally within about 1.5 p.u.. Details about the maximum fault current in different fault phases can be found in the prior art.

B. Comparisons Between CSC and DSC

In a normal operation, IIRESs are typically controlled to achieve a maximum power output.

To remain connected to a power network, the IIRESs normally switch to a current control mode after detecting a short-circuit fault. Thus, the fault response of IIRESs primarily relies on the adopted control loops. Fault characteristics of IIRESs with CSC and those of IIRESs with DSC are compared from the control structure and dynamic response in the subsequent analysis.

1) Coupled Sequence Control: To limit the fault current and inject reactive power into the system during a grid fault, the current reference of IIRESs is usually derived from the LVRT calculation mode. The commonly used LVRT control method of IIRESs with CSC can be represented as follows.

$$\begin{cases} I_d^* \leq \sqrt{I_{lim}^2 - I_q^{*2}} \\ I_q^* \geq 2(0.9 - E^+)I_{rated} \end{cases} \quad (1)$$

Where $I_{lim}$ is the limited fault current of IIRESs and it can be, for example, 1.2 p.u.. E is the amplitude of the terminal voltage e of the IIRES. Superscript * denotes the relevant reference value, superscripts +, − denote the positive and negative sequence components, and subscripts d, q denote electric quantities in a synchronous reference frame (SRF).

The current loop of IIRESs with CSC can be considered as a typical second-order system. To improve the frequency response, the proportional and integral gains ($k_p$ and $k_i$) of the current loop are usually set to cancel the pole caused by a power filter, i.e., $k_p=\omega_c L$ and $k_i=\omega_c R$, where $\omega_c$ is the open-loop cutoff frequency of the current loop, and R, L are the total resistance and inductance of the power filter. Based on this tuning method, the closed-loop transfer function of IIRESs with CSC alters into a stable first-order system as presented in an equation (2).

$$G^{CSC}(s) = \frac{\omega_c}{s + \omega_c} \quad (2)$$

Where s is the Laplace operator.

Figure 2:
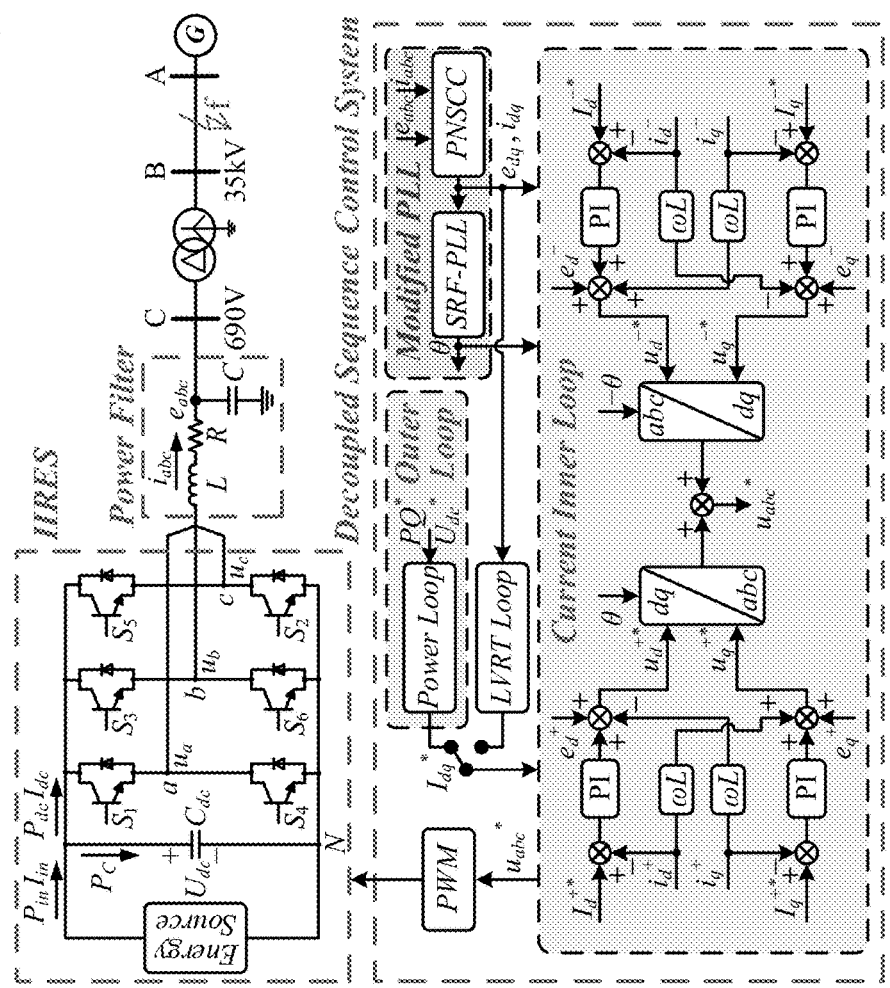
FIG. 2 illustrates a schematic diagram of an IIRES with a decoupled sequence control (DSC) according to an embodiment of the present disclosure.

2) Decoupled Sequence Control: FIG. 2 illustrates a diagram 200 of an IIRES with DSC according to an embodiment of the present disclosure. To satisfy the requirement of system operators to provide negative sequence currents, the simple CSC needs to be evolved into DSC as shown in FIG. 2.

For symmetric faults, the positive current references $I_{dq}^{+*}$ of IIRESs with DSC can be determined by the equation (1), and $I_{dq}^{-*}=0$. In the case of asymmetric faults, IIRESs with DSC can absorb or inject negative sequence fault currents from or to the grid, and the corresponding LVRT mode can be expressed as follows.

$$\begin{bmatrix} I_d^{+*} \\ I_q^{+*} \\ I_d^{-*} \\ I_q^{-*} \end{bmatrix} = \frac{2}{3} \begin{bmatrix} e_d^+ & e_q^+ \\ e_q^+ & -e_d^+ \\ -Ke_d^- & Ke_q^- \\ -Ke_q^- & -Ke_d^- \end{bmatrix} \begin{bmatrix} \frac{P^*}{M} \\ \frac{Q^*}{N} \end{bmatrix} \quad (3)$$

Where P and Q are the instantaneous active power and reactive power. $M=(e_d^+)^2+(e_q^+)^2-K[(e_d^-)^2+(e_q^-)^2]$, $N=(e_d^+)^2+(e_q^+)^2+K[(e_d^-)^2+(e_q^-)^2]$, and K=0, 1, or −1 with control targets of symmetrical currents injection, constant active or reactive power, respectively. K=1 is taken as an example in the present disclosure for the subsequent analysis. Note that the equation (3) usually requires a hard limiter to limit the generated current references. Details about the hard limiter can be found in the prior art.

DSC shows two essential differences compared with CSC. First, the negative sequence current control is introduced in the DSC system, and thus the control dimensions of IIRESs with DSC are expanded. Second, the PNSCC mode is needed for DSC to separate the sequence components, which improves the control complexity of IIRESs with DSC.

Figure 3:
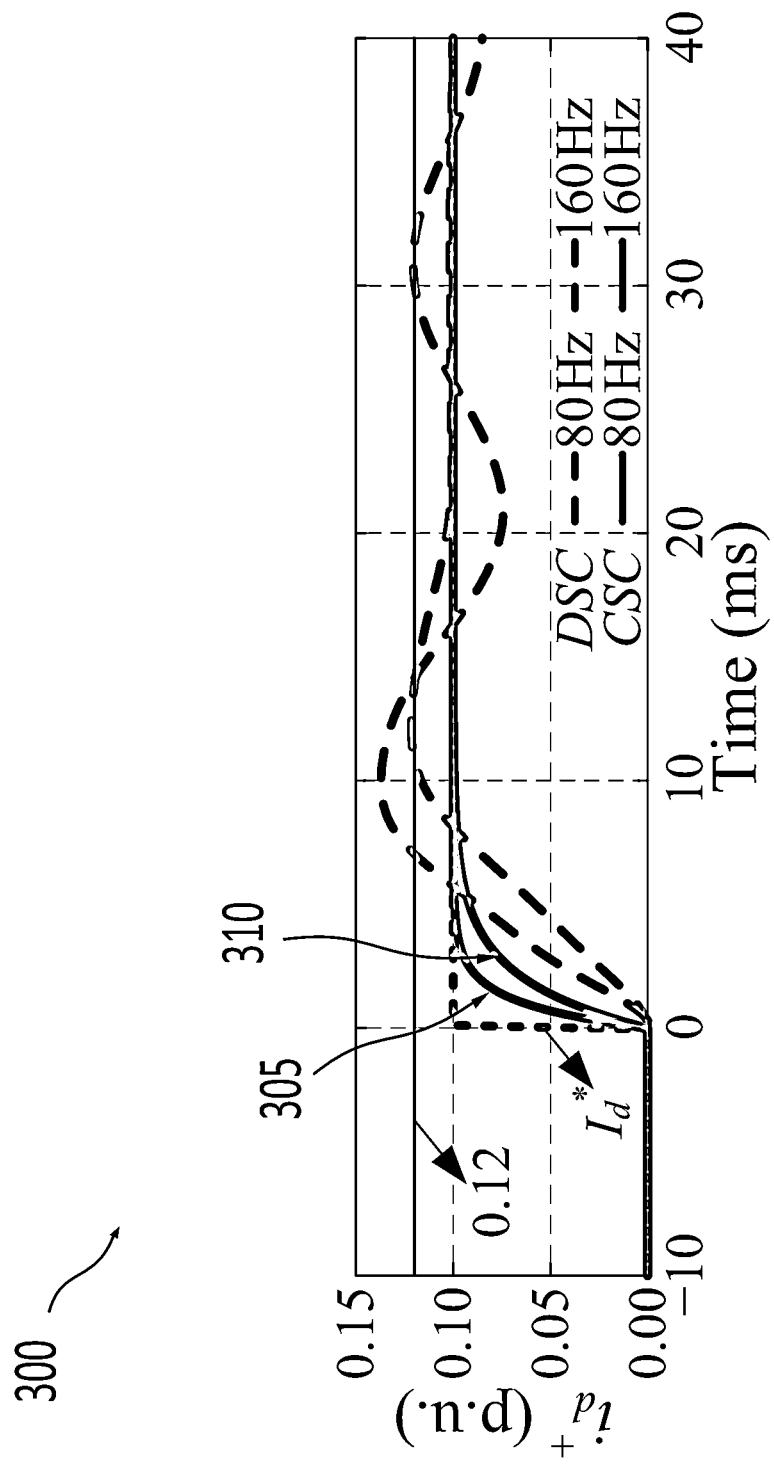
FIG. 3 shows a schematic diagram of step responses of IIRESs with different values of $\omega_c$. according to an embodiment of the present disclosure.

FIG. 3 illustrates a diagram 300 of step responses of IIRESs with different values of we according to an embodiment of the present disclosure. As shown, FIG. 3 presents step responses of IIRESs with CSC and those of IIRESs with DSC. Based on the first-order transfer function shown in the equation (2), there is no overshoot observed from the solid lines 305, 310 in the diagram 300, and different $\omega_c$ merely determines the rising time of the step response of IIRESs with CSC. However, the overshoot of IIRESs with DSC is dramatic with a larger $\omega_c$. It can be seen from FIG. 2 that the positive and negative sequence current loops of the DSC system are completely symmetric. Hence, the overshoots in FIG. 3 are attributed to the introduction of the PNSCC mode. Thus, the dynamic response of the PNSCC mode needs to be fully analyzed.

III. FAULT MODELING OF IIRESS WITH DSC

The PNSCC is a key control technology of IIRESs with DSC. Therefore, the mathematical models of different PNSCC modes are first investigated.

A. Transfer Function Models of Different PNSCC Modes

Figure 4:
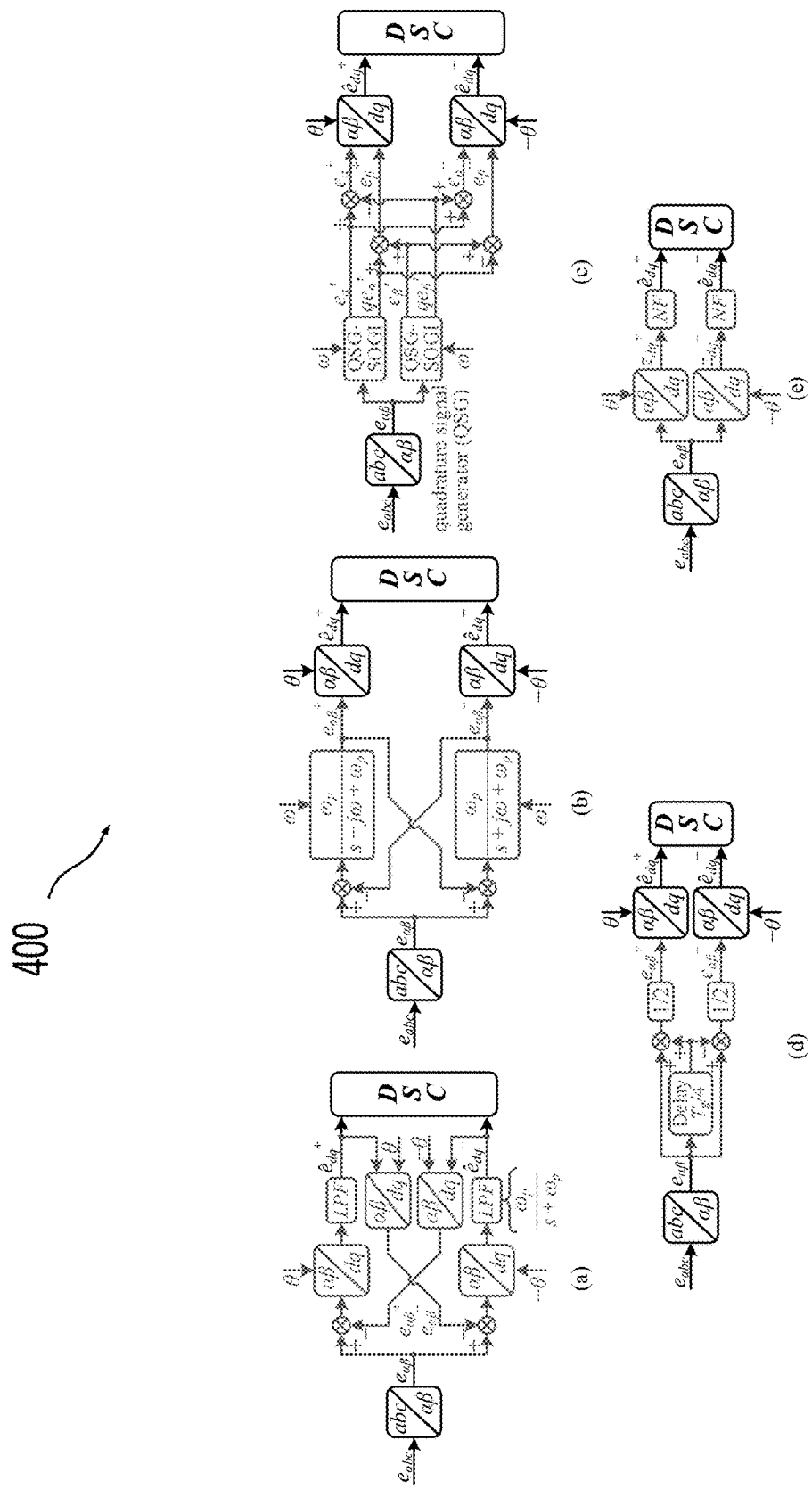
FIG. 4 shows a schematic diagram of five basic positive and negative sequence components calculation (PNSCC) structures according to an embodiment of the present disclosure.

FIG. 4 illustrates a diagram 400 of five basic PNSCC structures according to an embodiment of the present disclosure. To ensure the generality, five basic PNSCC structures normally used in IIRESs (as presented in FIG. 4) are illustrated in the subsequent analysis. Other modified PNSCC structures can be similarly analyzed. As shown in FIG. 4, the diagram (a) illustrates a dual synchronous reference frame (DSRF), the diagram (b) illustrates a dual complex-coefficient filter (DCCF); the diagram (c) illustrates a dual second-order generalized integrator (DSOGI), the diagram (d) illustrates a delayed signal cancellation (dsc), and the diagram (e) illustrates a notch filter (NF) (e.g., $e_{abc}$).

From FIG. 4, the anticipated derived target of the PNSCC can be expressed in the SRF system as follows.

$$\hat{X}_{dq}(s) = H^\varphi(s) X_{dq}(s) = \begin{bmatrix} H_{11} & L & H_{14} \\ M & O & M \\ H_{41} & L & H_{44} \end{bmatrix} X_{dq}(s) \quad (4)$$

Where $X_{dq}(s)$ is the true value of the grid current i, inverter output voltage u or e, $X_{dq}(s)=[X_d^+(s), X_q^+(s), X_d^-(s), X_q^-(s)]^T$, and $\hat{X}_{dq}(s)$ is the estimated value extracted by the PNSCC. $H^\varphi(s)$ is the objective transfer function of the PNSCC, and superscript $\varphi \in \{$DSRF, DCCF, DSOGI, dsc, NF$\}$.

To facilitate the derivation of PNSCC mathematical models, a modulation theory can be presented as follows.

$$\begin{cases} L\{x(t)\cos(\omega t)\} = \frac{1}{2}(X(s-j\omega) + X(s+j\omega)) \\ L\{x(t)\sin(\omega t)\} = \frac{1}{2j}(X(s-j\omega) - X(s+j\omega)) \end{cases} \quad (5)$$

Where j is the imaginary unit.

The transfer matrix $T_{\alpha\beta \to dq}(\theta)$ can be defined in an equation (6), and the sign matrix C can be shown in an equation (7).

$$T_{\alpha\beta \to dq}(\theta) = \begin{bmatrix} \cos(\theta) & \sin(\theta) & 0 & 0 \\ -\sin(\theta) & \cos(\theta) & 0 & 0 \\ 0 & 0 & \cos(\theta) & -\sin(\theta) \\ 0 & 0 & \sin(\theta) & \cos(\theta) \end{bmatrix} \quad (6)$$

$$C = \begin{bmatrix} 1 & 0 & 1 & 0 \\ 0 & 1 & 0 & 1 \end{bmatrix} \quad (7)$$

Where subscripts $\alpha$, $\beta$ denote electric quantities in a static two-phase reference frame, and $\theta$, $\omega$ are the phase angle and angular frequency estimated by a phase-locked loop (PLL).

1) Dual Synchronous Reference Frame (DSRF)-based PNSCC: The DSRF-based PNSCC is a prior art technique of IIRESs to extract the positive and negative sequence components. The characteristic transfer function of the DSRF-based PNSCC in the $\alpha\beta$ system can be written as follows.

$$\hat{X}_{\alpha\beta}(s) = \frac{\omega_p}{s^2 + 2\omega_p s + \omega^2} \begin{bmatrix} s & -\omega \\ \omega & s \\ s & \omega \\ -\omega & s \end{bmatrix} X_{\alpha\beta}(s) \quad (8)$$

Where $\hat{X}_{\alpha\beta}(s)=[X_\alpha^+(s), X_\beta^+(s), X_\alpha^-(s), X_\beta^-(s)]^T$, $X_{\alpha\beta}(s)=[X_\alpha(s), X_\beta(s)]^T$ and $\omega_p$ is the cutoff frequency of the adopted filter.

To obtain the target shown in the equation (4), $T_{\alpha\beta \to dq}(\theta)$ is applied to both sides of the equation (8), meanwhile, $X_{\alpha\beta}(s)$ can be expressed as follows.

$$X_{\alpha\beta}(s) = L\{CT_{\alpha\beta \to dq}^{-1}(\theta) x_{dq}(t)\} \quad (9)$$

By applying the equations (5) to (9) and assuming elements in $x_{dq}(t)$ are in the form of step-inputs, the equation (8) can be simplified in the dq plane to obtain $H^{DSRF}(s)$ as follows.

$$H_{11} = \frac{\omega_p s^3 + 2\omega_p^2 s^2 + 4\omega^2 \omega_p s + 4\omega^2 \omega_p^2}{s^4 + 4\omega_p s^3 + 4(\omega^2 + \omega_p^2)s^2 + 8\omega^2 \omega_p s + 4\omega^2 \omega_p^2} \quad (10)$$

$$H_{12} = \frac{-2\omega\omega_p^2 s}{s^4 + 4\omega_p s^3 + 4(\omega^2 + \omega_p^2)s^2 + 8\omega^2 \omega_p s + 4\omega^2 \omega_p^2}$$

$$H_{13} = \frac{(s + 2\omega_p)\omega_p s^2}{s^4 + 4\omega_p s^3 + 4(\omega^2 + \omega_p^2)s^2 + 8\omega^2 \omega_p s + 4\omega^2 \omega_p^2}$$

$$H_{14} = \frac{2(s + \omega_p)\omega\omega_p s}{s^4 + 4\omega_p s^3 + 4(\omega^2 + \omega_p^2)s^2 + 8\omega^2 \omega_p s + 4\omega^2 \omega_p^2}$$

Where $H_{22}=H_{33}=H_{44}=H_{11}$, $H_{21}=H_{34}=-H_{43}=-H_{12}$, $H_{31}=H_{42}=H_{24}=H_{13}$, and $H_{41}=-H_{32}=-H_{23}=H_{14}$.

2) Dual Complex-coefficient Filter (DCCF)-based PNSCC: The DCCF-based PNSCC can be mathematically equivalent to the DSRF-based PNSCC. Therefore, the transfer function of the DCCF-based PNSCC in the $\alpha\beta$ system is the same as the equation (8). Hence, $H^{DCCF}(s) = H^{DSRF}(s)$.

3) Dual Second-order Generalized Integrator (DSOGI)-based PNSCC: Similarly, the deduction in the equations (5)-(9) can be applied to the transfer function between $\hat{X}_{\alpha\beta}(s)$ and $X_{\alpha\beta}(s)$ of the DSOGI-based PNSCC to yield $H^{DSOGI}(s)$ as $$H_{11} = \frac{k\omega s^3 + k^2\omega^2 s^2 + 4k\omega^3 s + 2k^2\omega^4}{2s^4 + 4\omega s^3 + 2(k^2 + 4)\omega^2 s^2 + 8k\omega^3 s + 2k^2\omega^4} \quad (11)$$

$$H_{12} = \frac{-k^2\omega^3 s}{2s^4 + 4\omega s^3 + 2(k^2 + 4)\omega^2 s^2 + 8k\omega^3 s + 2k^2\omega^4}$$

$$H_{13} = \frac{k\omega(s + k\omega)s^2}{2s^4 + 4\omega s^3 + 2(k^2 + 4)\omega^2 s^2 + 8k\omega^3 s + 2k^2\omega^4}$$

$$H_{14} = \frac{k\omega(2s + k\omega)\omega s}{2s^4 + 4\omega s^3 + 2(k^2 + 4)\omega^2 s^2 + 8k\omega^3 s + 2k^2\omega^4}$$

Where k is the constant parameter of DSOGI. $H_{22}=H_{33}=H_{44}=H_{11}$, $H_{21}=H_{34}=-H_{43}=-H_{12}$, $H_{31}=H_{42}=H_{24}=H_{13}$, and $H_{41}=-H_{32}=-H_{23}=H_{14}$.

4) Delayed Signal Cancellation (dsc)-based PNSCC: The dsc-based PNSCC mode has gained much attention because of its good applicability. The transfer function of this mode can be described in the $\alpha\beta$ system as follows.

$$\hat{X}_{\alpha\beta}(s) = \frac{1}{2}\begin{bmatrix} 1 & -e^{-sT} \\ e^{-sT} & 1 \\ 1 & e^{-sT} \\ -e^{-sT} & 1 \end{bmatrix} X_{\alpha\beta}(s) \quad (12)$$

Where $T=T_g/4$ and $T_g$ is the time cycle of the grid voltage.

Likewise, $H^{dsc}(s)$ can be given in an equation (13) by using the equations (5)-(9) as $$H_{11} = \frac{1+e^{-sT}}{2}, H_{12} = 0, H_{13} = \frac{H_{11}s^2}{s^2+4\omega^2}, H_{14} = \frac{H_{11}2\omega s}{s^2+4\omega^2} \quad (13)$$

$$H_{22} = H_{33} = H_{44} = H_{11}, H_{21} = H_{34} = -H_{43} = -H_{12}$$

$$H_{31} = H_{42} = H_{24} = H_{13}, H_{41} = -H_{32} = -H_{23} = H_{14}$$

5) Notch Filter-based PNSCC: The NF-based PNSCC uses typical band-rejection filters to separate the desired signals, resulting in its simple structure. Thus, the transfer function of the NF-based PNSCC can be determined based on the diagram (e) in FIG. 4 as $$\hat{X}_{dq}(s) = NF(s)Z_{dq}(s) = \frac{s^2+\omega_p^2}{s^2+2k\omega_p s+\omega_p^2}Z_{dq}(s) \quad (14)$$

By rewriting $Z_{dq}(s)$ with $X_{dq}(s)$ according to the diagram (e) in FIG. 4 and substituting the equation (5) into the equation (14), $H^{NF}(s)$ can be expressed as $$H_{11} = NF(s)H_{12} = 0, H_{13} = \frac{H_{11}s^2}{s^2+4\omega^2}, H_{14} = \frac{H_{11}2\omega s}{s^2+4\omega^2} \quad (15)$$

$$H_{22} = H_{33} = H_{44} = H_{11}, H_{21} = H_{34} = -H_{43} = -H_{12}$$

$$H_{31} = H_{42} = H_{24} = H_{13}, H_{41} = -H_{32} = -H_{23} = H_{14}$$

In accordance with the above analysis, if k and $\omega_p$ are selected under certain conditions, e.g., k=2 and $\omega_p$=100, there is a mathematical relation in the dq plane, $H^{DSRF}(s)=H^{DCCF}(s)=H^{DOSGI}(s)$. For the dsc-based PNSCC, $H^{dsc}(s)$ is determined by T. Besides, $H^{NF}(s)$ mainly depends on NF(s).

It is noted that the non-diagonal elements in $H^\varphi(s)$ vary with different forms of inputs of $x_{dq}(t)$ (such as the trigonometric-, exponential-, or compound-inputs). However, the diagonal elements in $H^\varphi(s)$ always remain the same as those derived from the step-inputs of $x_{dq}(t)$. By substituting the final value theorem in the Laplace domain to $H^\varphi(s)$, the non-diagonal elements in $H^\varphi(s)$ turn into 0, while the diagonal elements equal to 1. Therefore, the diagonal elements persistently affect the transient and steady-state phases of IIRESs with DSC, and different non-diagonal elements merely result in the coupling effects in the transient phase.

B. Detailed Fault Model of IIRESs with DSC

The circuit response of IIRESs with DSC in the SRF system can be written in the Laplace domain as $$U_{dq}(s)=P_d(s)I_{dq}(s)+\omega LQI_{dq}(s)+E_{dq}(s) \quad (16)$$

Where $P_d(s)$ is the damping term attributed to the power filter and $P_d(s)=(Ls+R)$. Q is the sign matrix composed of −1, 0, and 1.

On basis of the control structure presented in FIG. 2, the control response of IIRESs with DSC can be yielded as $$U_{dq}*(s)=PI(s)(I_{dq}*(s)-\hat{I}_{dq}(s))+\omega LQ\hat{I}_{dq}(s)+\hat{E}_{dq}(s) \quad (17)$$

Where $PI(s)=(k_p+k_i/s)$.

By substituting the equation (4) into the equation (17), $\hat{X}_{dq}(s)$ can be represented by $X_{dq}(s)$ multiplied by $H^\varphi(s)$. Because the switching frequency of IIRESs is normally higher than thousands of Hertz, $U_{dq}(s)\approx U_{dq}*(s)$ can be assumed. Thus, by merging the equation (16) into the equation (17) and after some simple mathematical manipulations, a detailed fault model of IIRESs with DSC can be derived as $$I_{dq}(s)=G_m^{-1}(s)(PI(s)JI_{dq}*(s)+(H^\varphi(s)-J)E_{dq}(s)) \quad (18)$$

Where J is an identity matrix, and:

$$G_m(s) = \begin{bmatrix} G_{11} & L & G_{14} \\ M & O & M \\ G_{41} & L & G_{44} \end{bmatrix} \quad (19)$$

Where $G_{11}=PI(s)H_{11}+P_d(s)+\omega LH_{21}$, $G_{12}=PI(s)H_{12}+\omega L(H_{22}-1)$, $G_{13}=PI(s)H_{13}+\omega LH_{23}$, and $G_{14}=PI(s)H_{14}+\omega LH_{24}$. $G_{22}=G_{33}=G_{44}=G_{11}$, $G_{21}=G_{34}=-G_{43}=-G_{12}$, $G_{31}=G_{42}=G_{24}=G_{13}$, and $G_{41}=-G_{32}=-G_{23}=G_{14}$.

Figure 5:
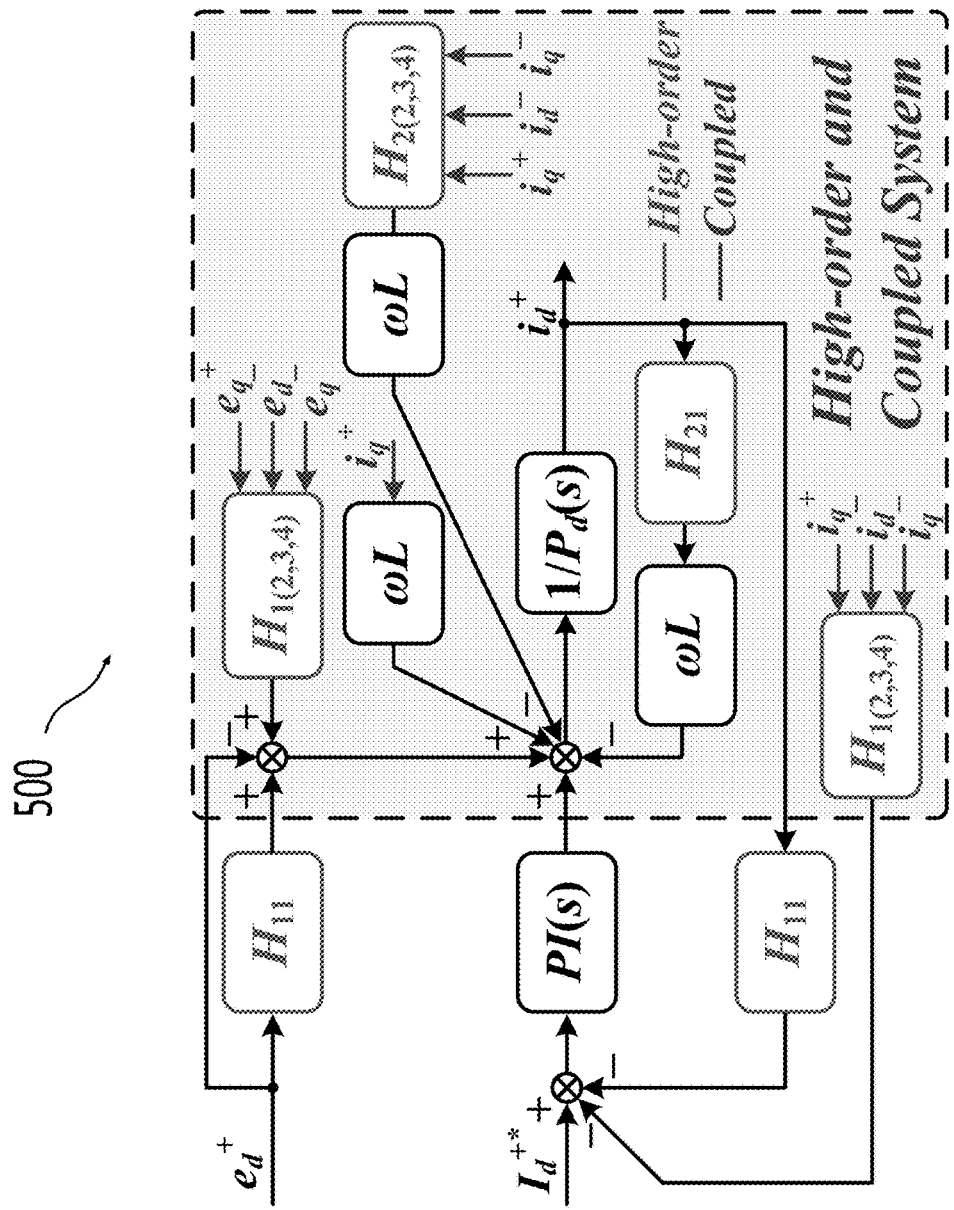
FIG. 5 shows a schematic diagram of a detailed fault model of IIRESs with a DSC according to an embodiment of the present disclosure.

FIG. 5 shows a schematic diagram 500 of a detailed fault model of IIRESs with a DSC according to an embodiment of the present disclosure. Compared with the equation (2), the system order and dimension of IIRESs with DSC are significantly increased. This property can be seen more intuitively in FIG. 5. Since control responses of $i_d^+$, $i_q^+$, $i_d^-$ and $i_q^-$ show the identical variation law with the same excitations, only the control block diagram of $i_d^+$ is taken as an example in FIG. 5.

IV. REDUCED-ORDER MODEL OF IIRESS WITH DSC

Due to the high-order and coupling features of the equation (18), the detailed model of IIRESs with DSC is hard to be applied in a fault analysis. Therefore, some simplifications are necessary.

A. Unified Model of Different PNSCC Modes

The complexity in FIG. 5 can be attributed to the diagonal and non-diagonal elements in $H^\varphi(s)$. Thus, $H^\varphi(s)$ needs to be simplified from the following two aspects.

1) Simplification of the Non-diagonal Elements: The coupling features caused by the non-diagonal transfer functions in $H^\varphi(s)$ mainly result in a time delay of the IIRES's fault response. This property can be equivalent by introducing a damping compensation coefficient A in the damping term, i.e., $P_d(s)$ is modified to $P_{dm}(s)=(\lambda Ls+R)$. By then, the non-diagonal elements in $H^\varphi(s)$ can be ignored.

2) Simplification of the Diagonal Elements: Based on the simplification of the non-diagonal elements, only the diagonal elements are retained in $H^\varphi(s)$. Since the diagonal elements in the DSRF-, DCCF- and DSOGI-based PNSCC modes present high-order characteristics, a balancing-free square-root algorithm can be employed to yield a reduced-order model of these three PNSCC modes as (it is assumed that k=2 and $\varphi_p=100\pi$).

$$H_{11}^{DSRF} = H_{11}^{DCCF} = H_{11}^{DSOGI} = \frac{334.7}{s+334.7} \quad (20)$$

For the dsc-based PNSCC, the pure time delay element $e^{-sT}$ in $H^{dsc}(s)$ makes it complicated. Hence, a first-order Padé approximation can be used to approximate $e^{-sT}$, and thus the diagonal element in $H^{dsc}(s)$ can be expressed as $$e^{-sT} \approx \frac{1 - Ts/2}{1 + Ts/2}, \quad H_{11}^{dsc} = \frac{400}{s + 400} \tag{21}$$

To cope with the harmonic influences, the NF-based PNSCC normally requires a narrow bandwidth. Therefore, $H_{11}^{NF}$ can be presented in a low-frequency range (it is assumed that k=0.707 and $\omega_p=200\pi$ for the NF-based PNSCC)

$$H_{11}^{NF} = \frac{s^2 + \omega_p^2}{s^2 + 2k\omega_p s + \omega_p^2} \approx \frac{\omega_p^2}{2k\omega_p s + \omega_p^2} = \frac{444.4}{s + 444.4} \tag{22}$$

Based on the above simplification and approximation, a unified model of different PNSCC modes can be further obtained in the form of a first-order LPF in the SRF system, as $$\hat{X}_{dq}(s) \approx H_s^\varphi(s) X_{dq}(s) = \frac{\omega_f}{s + \omega_f} J X_{dq}(s) \tag{23}$$

Where the cutoff frequency $\omega_f$ depends on the type of the PNSCC method and the corresponding parameters.

B. Reduced-Order Fault Model of IIRESs with DSC in Different Fault Phases

On basis of the unified model of different PNSCC modes, a reduced-order fault model of IIRESs with DSC can be established in the complete fault phases in the subsequent analysis.

1) Model in the FD Phase: Since the FD phase is defined as a period prior to IIRESs detecting a short-circuit fault, the control strategy of IIRESs has not switched to the LVRT control before $t_c$. Therefore, the outer loop remains working during this period. Due to the narrow control bandwidth of the outer control loop, the current reference generated by the outer loop can be assumed to be constant in the FD phase. Thus, only excitation related to $E_{dq}$ in the equation (18) exists in the FD phase. By eliminating terms with $I_{dq}^*$ in (18) and substituting the equation (23) into the equation (18), a simplified fault model of IIRESs with DSC in the FD phase can be given by (the d-axis positive sequence current is taken as an example) an equation (24).

$$G_{FD}^{DSC}(s) = \frac{I_d^+(s)}{E_d^+(s)} = \frac{-s^2}{(\lambda Ls + R)(s^2 + \omega_f s) + (Ls + R)\omega_c \omega_f} \tag{24}$$

By applying the inverse Laplace transform to the equation (24), the step response of the equation (24) can be written as (e.g., $\lambda=1$) follows.

$$i_{d_{FD}}^+(t) = \frac{Ae^{-(t-t_0)/\tau}}{R} + \frac{e^{-\zeta\omega_n(t-t_0)}}{RM} \sin(\omega_n M(t - t_0) + \varphi_1) \tag{25}$$

$$\varphi_1 = \arctan(M/(\omega_n \tau - \zeta)), \quad t_0 \le t \le t_c$$

Where $1/\tau=R/L$, $\omega_n=(\omega_c\omega_f)^{1/2}$, $\zeta=\omega_n/(2\omega_c)$, $M=(1-\zeta)^{1/2}$, $1/A=(\omega_n-\tau)^2+M^2$. Note that the pre-fault current needs to be added to the equation (25) in the practical calculation.

2) Model in the CTR Phase and FS Phase: Once the fault is detected, the outer loop is cut off and the IIRES switches to the LVRT control mode. By then, the control system enters the CTR phase determined by the current controller, and thus $I_{dq}^*$ begins to take effect. Meanwhile, $E_{dq}$ continuously affects the CTR phase. Similarly, by using the equation (23), the model attributed to $I_{dq}^*$ can be simplified as follows.

$$G_{CTR}^{DSC}(s) = \frac{I_d^+(s)}{I_d^{+*}(s)} = \frac{\omega_c(Ls + R)(s + \omega_f)}{(\lambda Ls + R)(s^2 + \omega_f s) + (Ls + R)\omega_c \omega_f} \tag{26}$$

The analytical result in the CTR phase can be derived by combining the equation (25) with the step response of the equation (26), as follows.

$$i_{d_{cm}}^+(t) = 1 + \frac{e^{-\zeta\omega_n(t-t_c)}}{2\xi M} \sin(\omega_n M(t - t_c) + \varphi_2) + i_{d_{FD}}^+(t) \tag{27}$$

$$\varphi_2 = \arctan(2\xi M/(2\xi^2 - 1)), \quad t_c \le t \le t_f$$

For the FS phase, the attenuation terms in the equation (27) decay to 0, and the fault current completely tracks the current reference decided by the current limiting strategy, i.e., $i_{d_{FS}}^+(t)=I_d^{+*}$, $t \ge t_f$.

Based on the above analysis, the reduced-order fault model of IIRESs with DSC presents remarkably staged characteristics. Besides, the controller parameters, filter parameters and effects of the PNSCC mode are taken into account in this fault model. Therefore, these factors can be comprehensively investigated for a control system design. Moreover, this model covers three fault phases (i.e., FD phase, CTR phase and FS phase) typically emerged in IIRESs in practice, and thus is applicable for the protection setup issues.

V. SIMULATION AND EXPERIMENTAL VERIFICATION

A. Simulation Verification

To verify the effectiveness of the disclosed fault model, a 500 kW IIRES is built based on the topology shown in FIG. 2 in PSCAD/EMTDC. Corresponding simulation parameters are presented in TABLE A I in the Appendix.

Notice that the non-diagonal elements in $H^\varphi(s)$ make the system highly complex (as shown in FIG. 5) and, therefore, it is difficult to obtain an analytical solution of $\lambda$. An alternative approach is using the calculation error between the calculated fault current of the disclosed model and the actual simulated result to opt for an appropriate $\lambda$. If the allowable calculation error in the fault analysis of IIRESs is less than 10%, $\lambda$ of the DSRF/DCCF/DSOGI-based PNSCC can be determined as 1-2, and $\lambda$ of the dsc/NF-based PNSCC can be 3-4.

Figure 6:
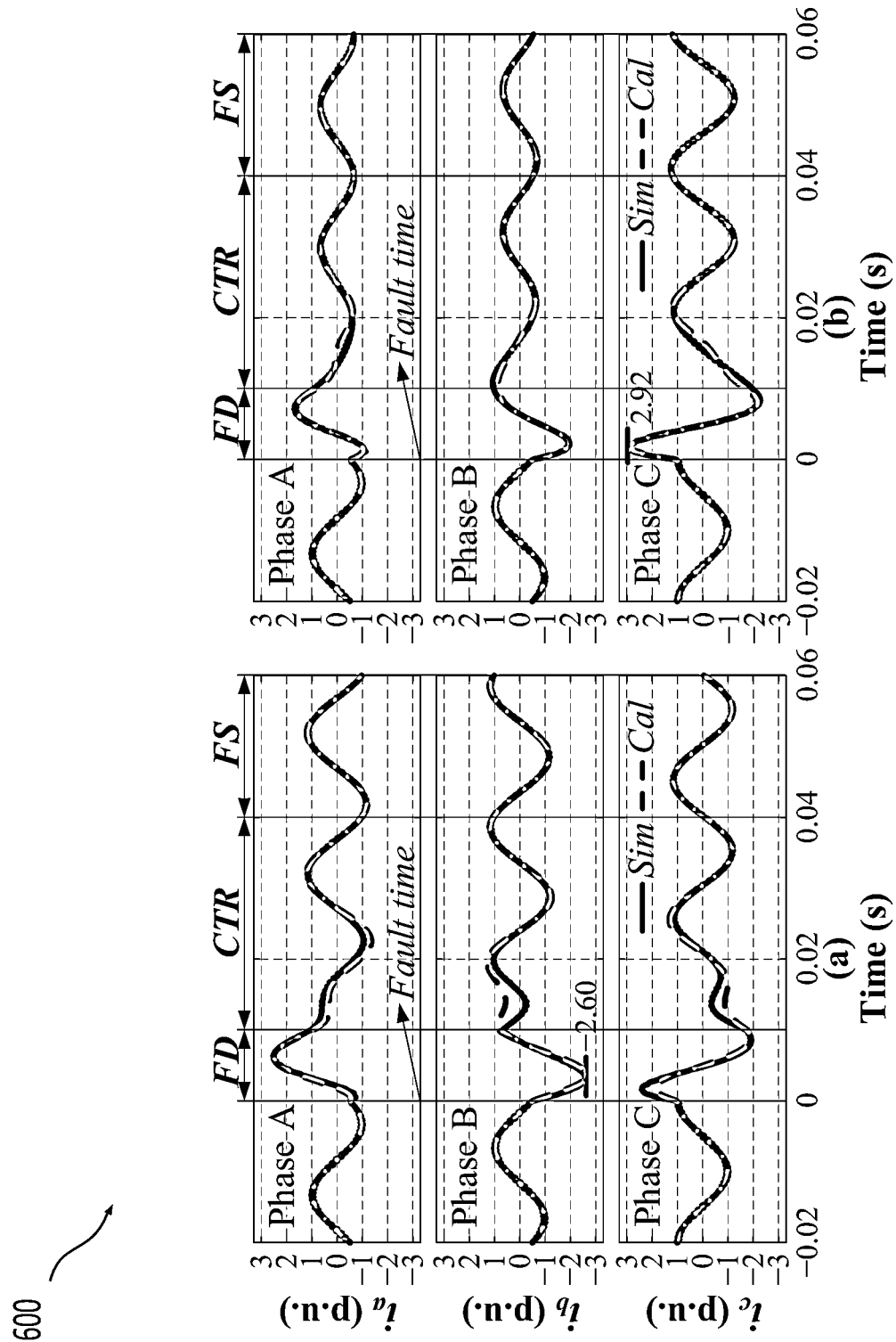
FIG. 6 shows a schematic diagram of fault response of an IIRES with a dual synchronous reference frame (DSRF)/dual complex-coefficient filter (DCCF)/dual second-order generalized integrator (DSOGI)-based PNSCC mode according to an embodiment of the present disclosure.
Figure 7:
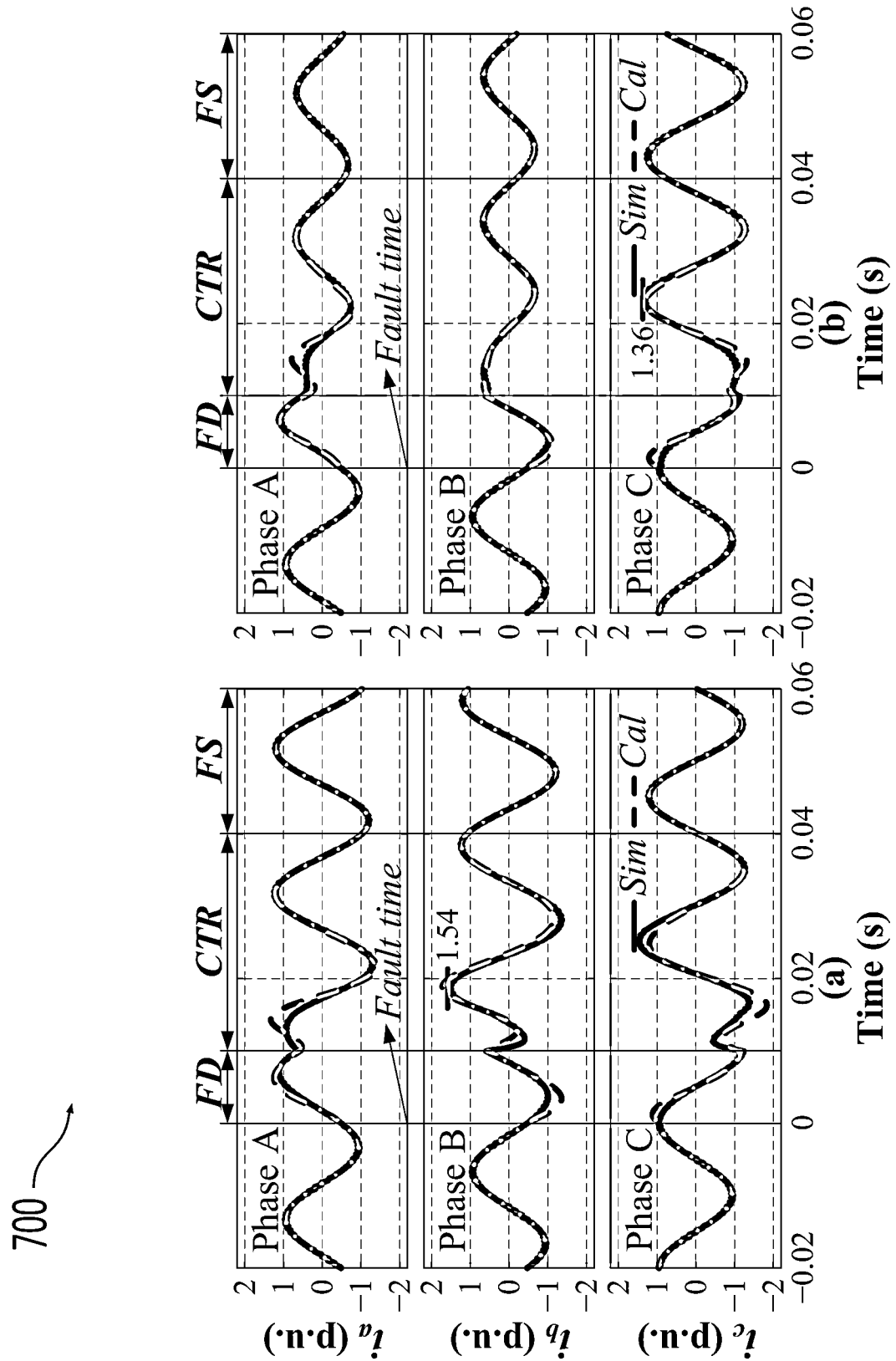
FIG. 7 shows a schematic diagram of fault response of an IIRES with a DSC-based PNSCC mode according to an embodiment of the present disclosure.
Figure 8:
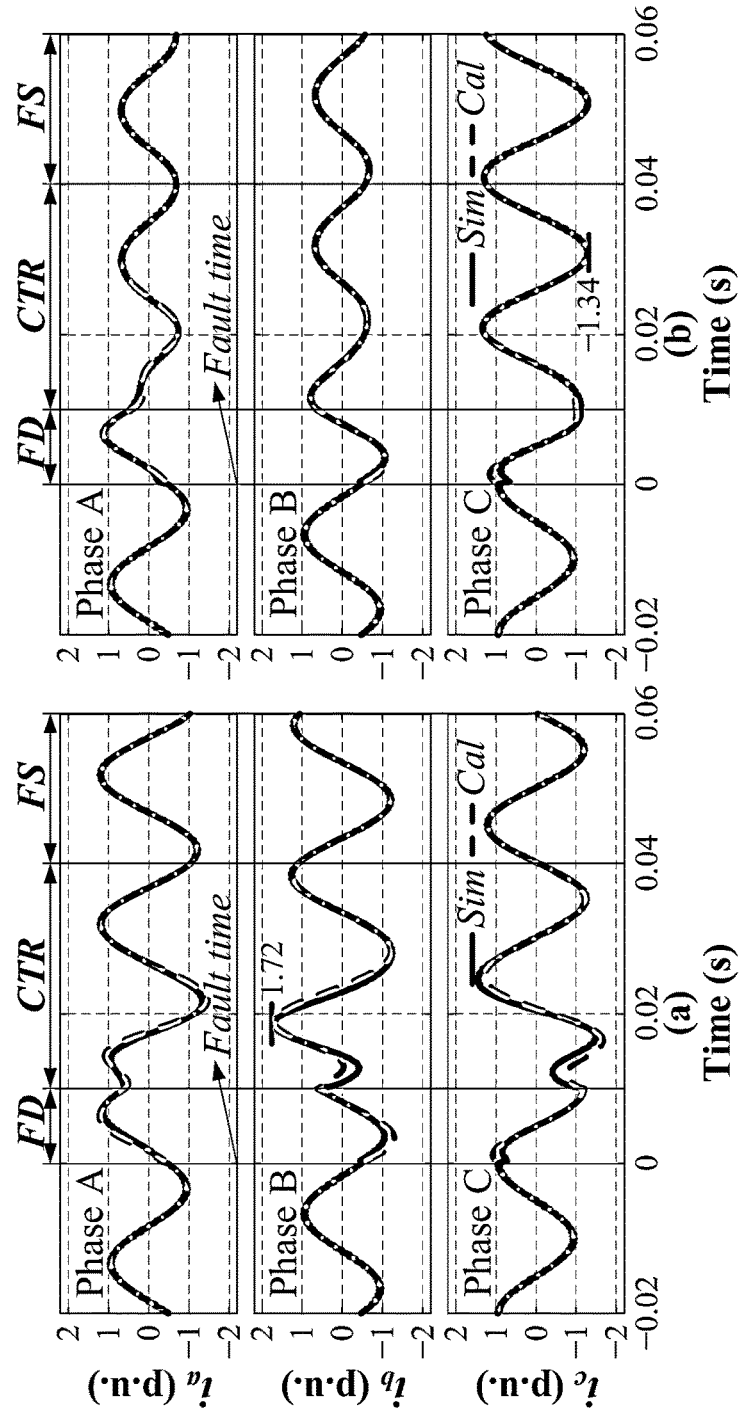
FIG. 8 shows a schematic diagram of fault response of an IIRES with a notch filter (NF)-based PNSCC mode according to an embodiment of the present disclosure.

1) Verification of the disclosed Model with Different PNSCC Modes: To verify the generality of the disclosed model, the IIRES with different PNSCC modes (as illustrated in Section III. A) is first established in simulation. Then, three-phase faults ($E^+$ dips to 0.4 p.u.) and two-phase faults ($E^+$ dips to 0.6 p.u.) are simulated to compare the simulation fault currents with the calculation results using the disclosed model. The comparison results are presented in FIGS. 6-8. FIG. 6 shows a schematic diagram 600 of fault response of an IIRES with a dual synchronous reference frame (DSRF)/dual complex-coefficient filter (DCCF)/dual second-order generalized integrator (DSOGI)-based PNSCC mode according to an embodiment of the present disclosure. The diagram (a) in FIG. 6 shows three-phase fault responses, and the diagram (b) in FIG. 6 shows two-phase (BC) fault responses. FIG. 7 shows a schematic diagram 700 of fault response of an IIRES with a DSC-based PNSCC mode according to an embodiment of the present disclosure. The diagram (a) in FIG. 7 shows three-phase fault responses, and the diagram (b) in FIG. 7 shows two-phase (BC) fault responses. FIG. 8 shows a schematic diagram 800 of fault response of an IIRES with a notch filter (NF)-based PNSCC mode according to an embodiment of the present disclosure. The diagram (a) in FIG. 8 shows three-phase fault responses, and the diagram (b) in FIG. 8 shows two-phase (BC) fault responses.

In the simulation, the IIRES operates with unity power factor in a normal condition, and switches to the LVRT control at 10 ms after fault occurrence, i.e., the period of FD phase is set to 10 ms. For the CTR phase, it lasts approximately 30 ms at the selected cutoff frequency of the current loop (e.g., 60 Hz). When the current tracking process is finished, the IIRES ultimately enters the FS phase at around 40 ms.

It can be observed from FIGS. 6-8 that the calculated fault currents using the disclosed model (labeled as Cal) coincide well with the simulated results (labeled as Sim). In addition, there are certain inrush currents in FIGS. 6-8 marked with green lines. The inrush current is defined as the maximum fault current with a peak value exceeding $I_{lim}$, which is mainly caused by the existence of the PNSCC mode and FD phase. Some IIRES fault models in the prior art also provide approaches to estimate the inrush currents, yet their calculation accuracy is limited because the above two factors are not fully considered.

Since the mathematic models of the DSRF-, DCCF- and DSOGI-based PNSCC modes are equivalent to each other in the dq plane under the chosen settings, fault current responses of IIRESs with these three PNSCC modes are nearly the same in simulation and calculation results as presented in the diagram 600 in FIG. 6. Similarly, by respectively substituting the simplified diagonal elements in $H_s^{dsc}(s)$ and $H_s^{NF}(s)$ into $H^{dsc}(s)$ and $H^{NF}(s)$, each element in the corresponding position of $H^{dsc}(s)$ and $H_s^{NF}(s)$ is similar. The sole discrepancy is ascribable to different $\omega_f$ of $H_s^{dsc}(s)$ and $H_s^{NF}(s)$ (i.e., 400 and 444.4). Accordingly, fault currents of IIRESs with the dsc- and NF-based PNSCC modes are approximately the same, as shown in the diagram 700 in FIG. 7 and the diagram 800 in FIG. 8.

The inrush currents in FIG. 6 are remarkably higher than those in FIGS. 7-8. This is mainly attributed to the difference in the system damping of IIRESs with different PNSCC modes.

Because the disclosed model uses A to reflect this property, the peak response of the inrush current can be accurately estimated.

Figure 9:
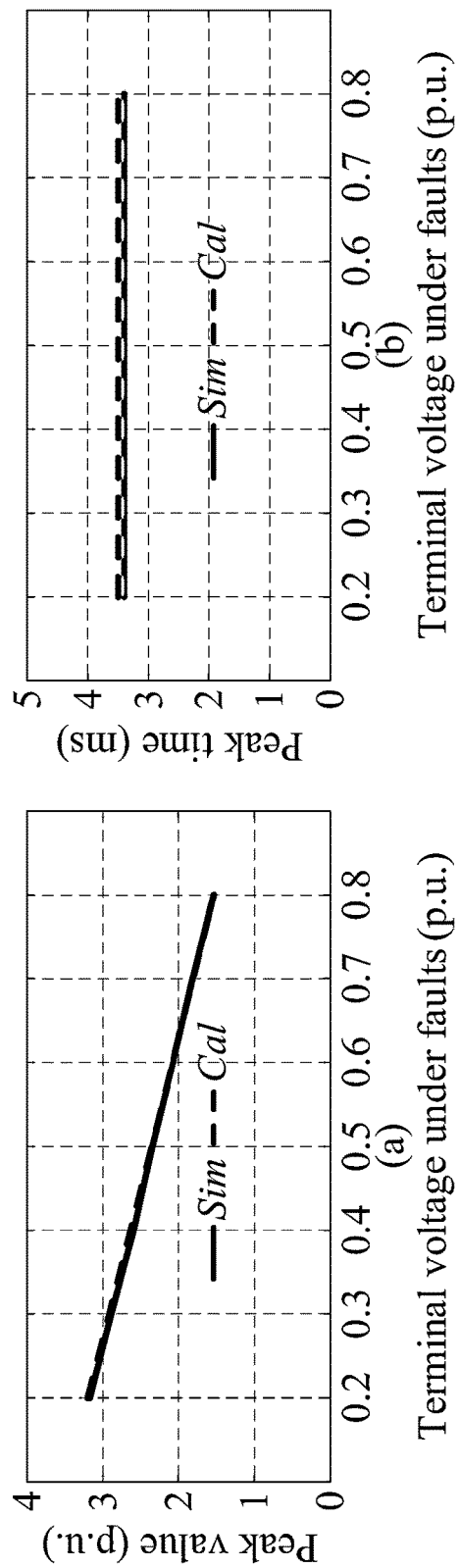
FIG. 9 shows a schematic diagram of comparisons between simulation fault currents and calculation results under different voltage sags according to an embodiment of the present disclosure.
Figure 10:
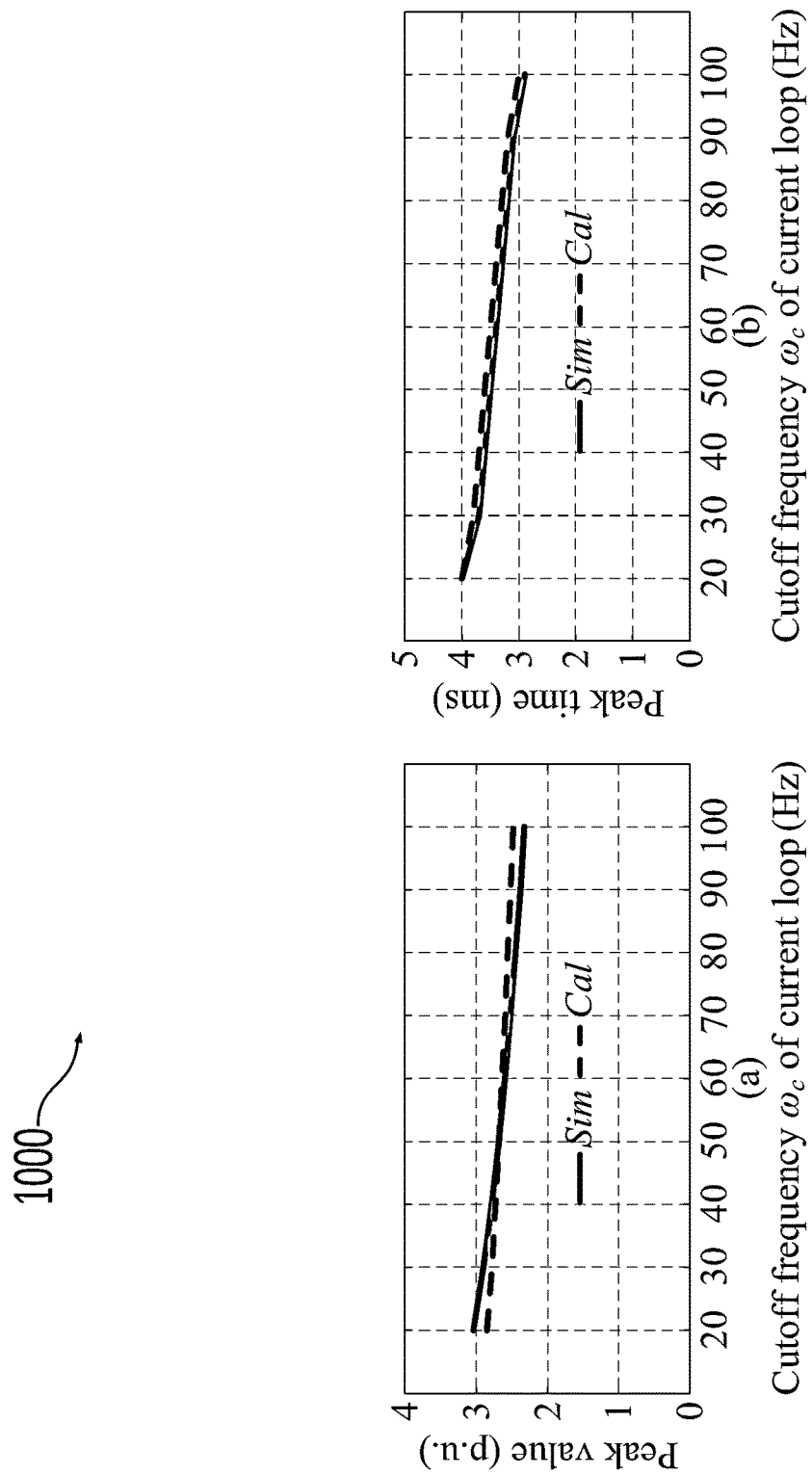
FIG. 10 shows a schematic diagram of comparisons between simulation fault currents and calculation results under different cutoff frequencies of a current loop according to an embodiment of the present disclosure.
Figure 11:
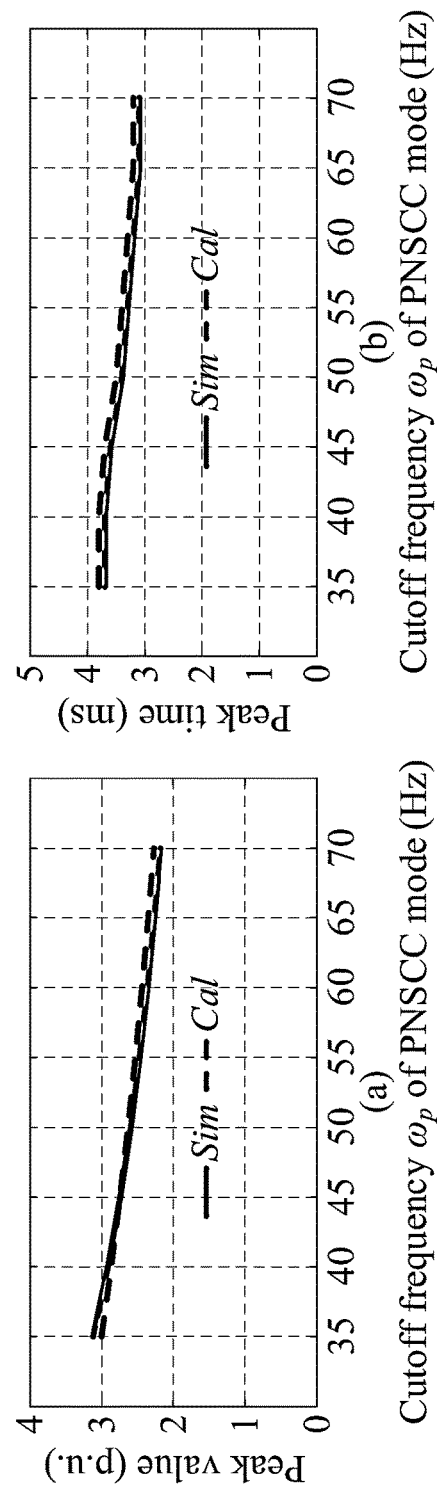
FIG. 11 shows a schematic diagram of comparisons between simulation fault currents and calculation results under different cutoff frequencies of a PNSCC mode according to an embodiment of the present disclosure.
Figure 12:
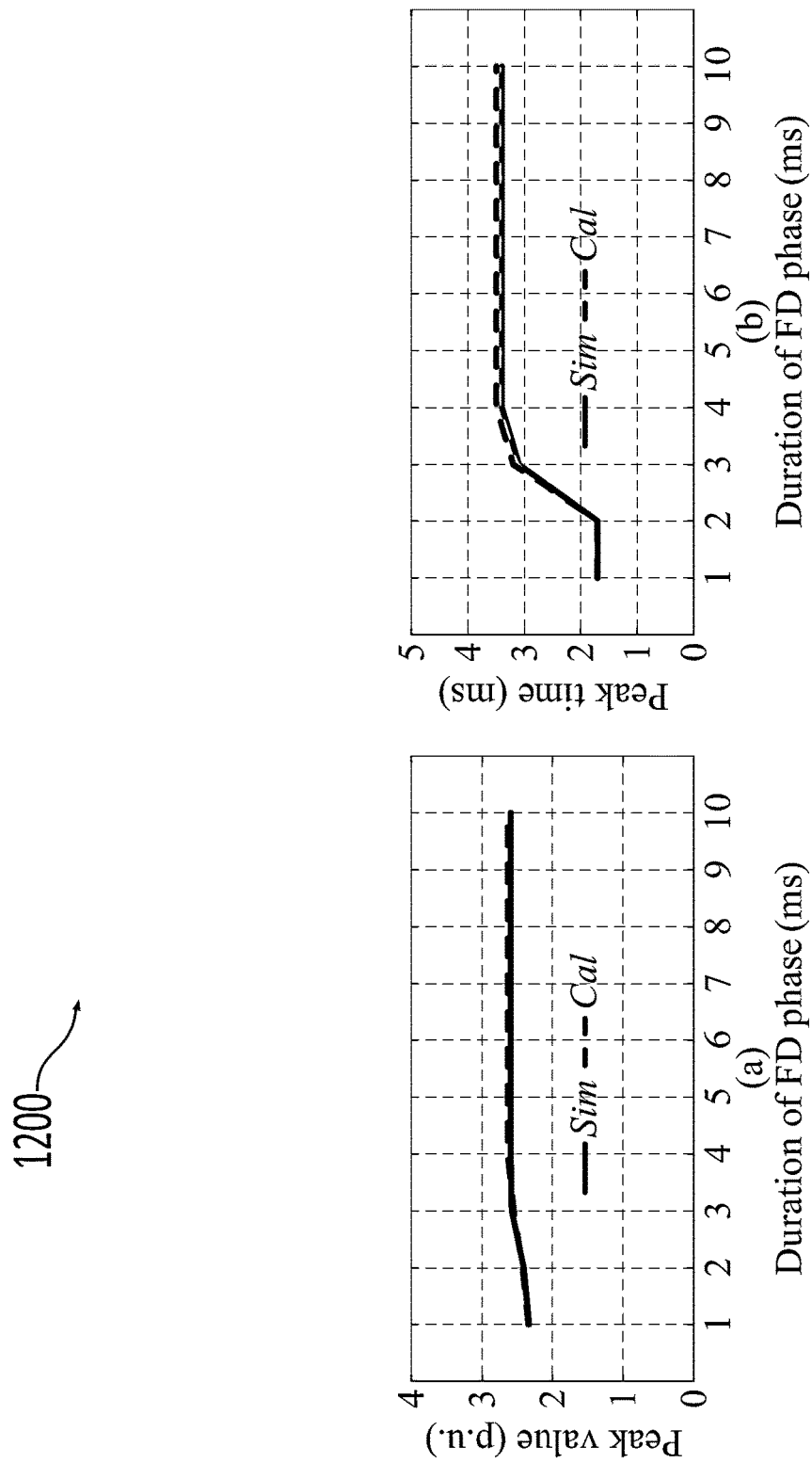
FIG. 12 shows a schematic diagram of comparisons between simulation fault currents and calculation results under different durations of a fault detection (FD) phase according to an embodiment of the present disclosure.

2) Verification of the Disclosed Model in Different Fault Scenarios: The simulation case studies under various fault conditions are further performed to verify the disclosed model. In all the cases, the IIRES with the DSRF-based PNSCC mode under three-phase faults (voltages dip to 0.4 p.u.) is applied to the simulation and the default parameters remain unchanged as those with the part 1). To evaluate the calculation accuracy of the model, the peak value and peak time of the inrush current under different fault conditions are selected as indexes to compare the simulation and calculation results, as presented in FIGS. 9-12. FIG. 9 shows a schematic diagram 900 of comparisons between simulation fault currents and calculation results under different voltage sags according to an embodiment of the present disclosure. The diagram (a) in FIG. 9 shows peak value, and the diagram (b) in FIG. 9 shows peak time. FIG. 10 shows a schematic diagram 1000 of comparisons between simulation fault currents and calculation results under different cutoff frequencies of a current loop according to an embodiment of the present disclosure. The diagram (a) in FIG. 10 shows peak value, and the diagram (b) in FIG. 10 shows peak time. FIG. 11 shows a schematic diagram 1100 of comparisons between simulation fault currents and calculation results under different cutoff frequencies of a PNSCC mode according to an embodiment of the present disclosure. The diagram (a) in FIG. 11 shows peak value, and the diagram (b) in FIG. 11 shows peak time. FIG. 12 shows a schematic diagram 1200 of comparisons between simulation fault currents and calculation results under different durations of a fault detection (FD) phase according to an embodiment of the present disclosure. The diagram (a) in FIG. 12 shows peak value, and the diagram (b) in FIG. 12 shows peak time.

As shown, FIG. 9 presents the peak response of the inrush current under different voltage sags. It can be observed from the diagram (a) in FIG. 9 that the peak value of the inrush current varies in a range of 1.5-3.2 p.u., and decreases almost linearly with the reduction of the voltage sag. For the peak time of the inrush current as shown in the diagram (b) in FIG. 9, it keeps constant with the variation of the voltage sag. Based on the analysis in Section IV B, the voltage sag degree merely affects the gain of I(s) in the equation (24), thus, it has impacts on the peak value and has no impacts on the peak time.

From the diagram (a) in FIG. 10, the peak value of the inrush current shows a downward tendency with the augment of $\omega_c$. This can be explained using the disclosed model that a larger $\omega_c$ reduces the amplitude of the attenuation terms in the equation (25), resulting in a slight peak response of the inrush current. The downtrend of the peak time in the diagram (b) in FIG. 10 can be analyzed by differentiating the equation (25) and calculating the relevant extreme point with an increasing $\omega_c$.

The impacts of the cutoff frequency $\omega_p$ of the PNSCC mode on the inrush current are shown in FIG. 11. It can be seen that the peak value depends almost linearly on the variation of $\omega_p$. In accordance with the analysis in Section IV A, $\omega_p$ is positively correlated with the cutoff frequency $\omega_f$ of the unified PNSCC model. Hence, the increase of $\omega_p$ gives rise to a larger of and improves the system damping ratio. On this basis, the system overshoot is reduced, and thus the peak value decreases. As shown in the diagram (b) in FIG. 11, the correlation between the peak time of the inrush current and $\omega_p$ is negative.

FIG. 12 illustrates the influence of the FD phase on the peak response of the inrush current. As shown in the diagram (a) in FIG. 12, the peak value tends to be constant with an increasing duration of the FD phase, i.e., the increase of $t_c$. On basis of the equation (25), if the inrush current occurs before $t_c$, the increase of $t_c$ will have no effects on the peak response of the inrush current. Thus, the peak value and peak time alter to be constant with the increase of $t_c$. It can also be observed from the diagram (b) in FIG. 12 that there is a sudden change in the peak time, this is because the inrush current is shifted from phase C to phase B when $t_c$ changes from about 2 ms to about 3 ms.

From FIGS. 9-12, the calculation peak responses of the inrush currents coincide well with the simulation results. In addition, the maximum peak value and peak time errors between the simulation and calculation results from FIGS. 9-12 are presented in TABLE I. It can be seen that the maximum peak value error is less than about 7% and the maximum peak time error is within about 5%. These errors mainly come from simplifications of the PNSCC mode: 1) the ignorance of the non-diagonal elements in $H^\varphi(s)$, and 2) the approximation of the diagonal elements in $H^\varphi(s)$. It is worth noting that these errors can be reduced by modifying A to an appropriate value when using the disclosed model. Thus, the calculation accuracy of this model is promising in the fault analysis of IIRESs with DSC.

TABLE I

MAXIMUM ERROR OF THE PEAK RESPONSE IN FIGS. 9-12

| Case | Maximum error of the peak value (%) | Maximum error of the peak time (%) |
|---|---|---|
| FIG. 9 | −1.58 | −2.94 |
| FIG. 10 | −6.67 | −3.45 |
| FIG. 11 | −4.22 | −3.23 |
| FIG. 12 | −1.58 | −3.23 |

B. Hardware-In-Loop Experimental Verification

Figure 13:
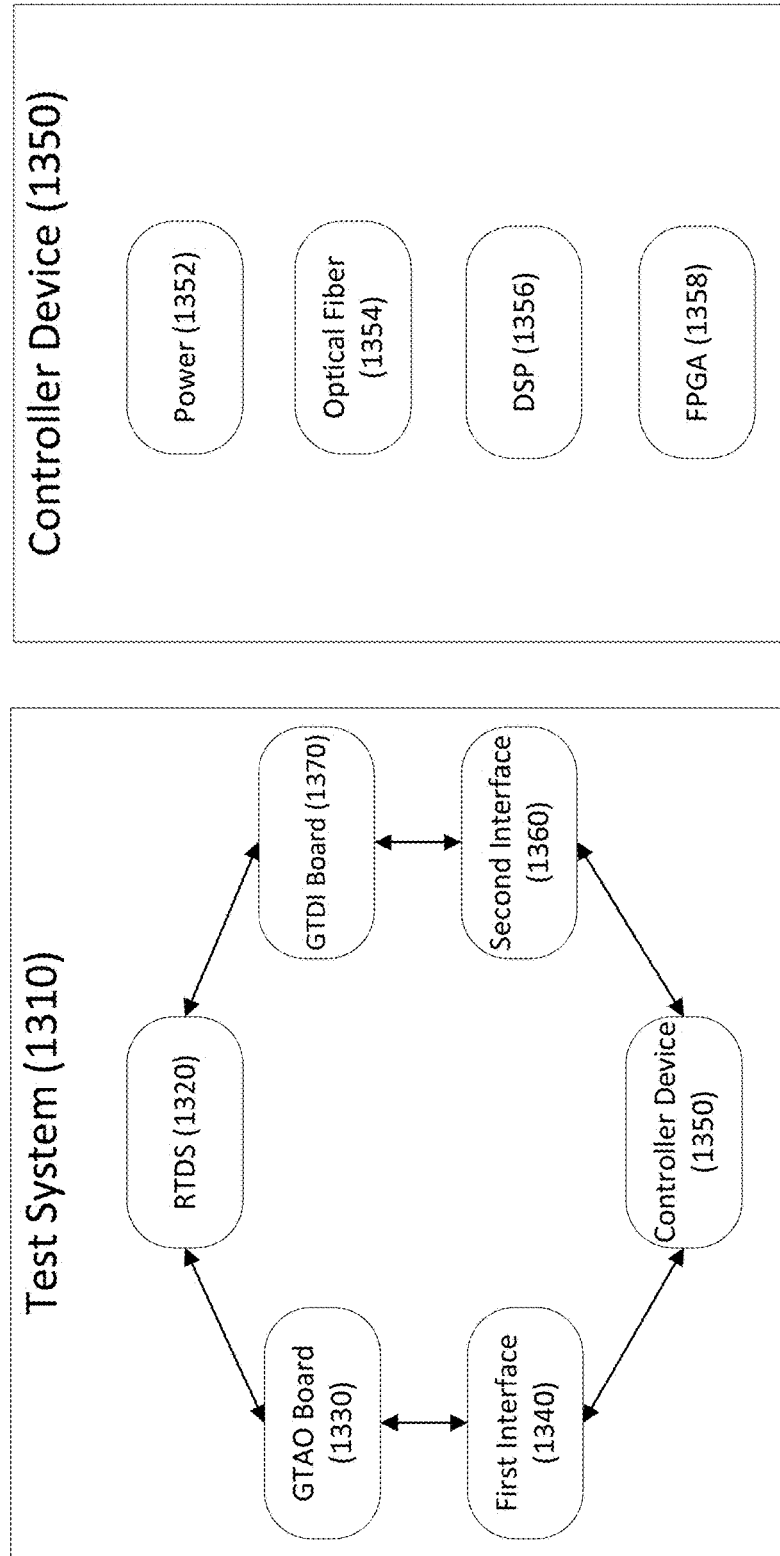
FIG. 13 shows a schematic diagram of an experiment platform according to an embodiment of the present disclosure.

FIG. 13 shows a schematic diagram 1300 of an experiment platform according to an embodiment of the present disclosure. The experimental platform can include a test system 1310. The test system 1310 may include a real time digital simulator (RTDS) 1320, a gigabit transceiver analog output (GTAO) board 1330, a first interface 1340, a controller device 1350, a second interface 1360, and a gigabit transceiver digital input (GTDI) board 1360, which are in data communication among them. The controller device 1350 may include a power 1352, an optical fiber 1354, a digital signal processor (DSP) 1356, and field programmable gate arrays (FPGA) 1356. To verify the disclosed model, hardware-in-loop experiments are conducted using the real time digital simulator (RTDS) 1320. The experiment platform is shown in the diagram 1300 in FIG. 13. The IIRES simulation model is established in the RTDS 1320 based on the topology in FIG. 2, and the relevant parameters are listed in TABLE A II in the Appendix. During the experiment, the analog signals are generated by the simulation model in the RTDS 1320 and input to the controller device hardware 1350 via the gigabit transceiver analog output (GTAO) board 1330. Then, the controller device 1350 can sample these analog signals and produce the digital signals. Finally, the digital signals are fed back to the RTDS 1320 through the gigabit transceiver digital input (GTDI) board 1370 for the real time simulation.

Figure 14:
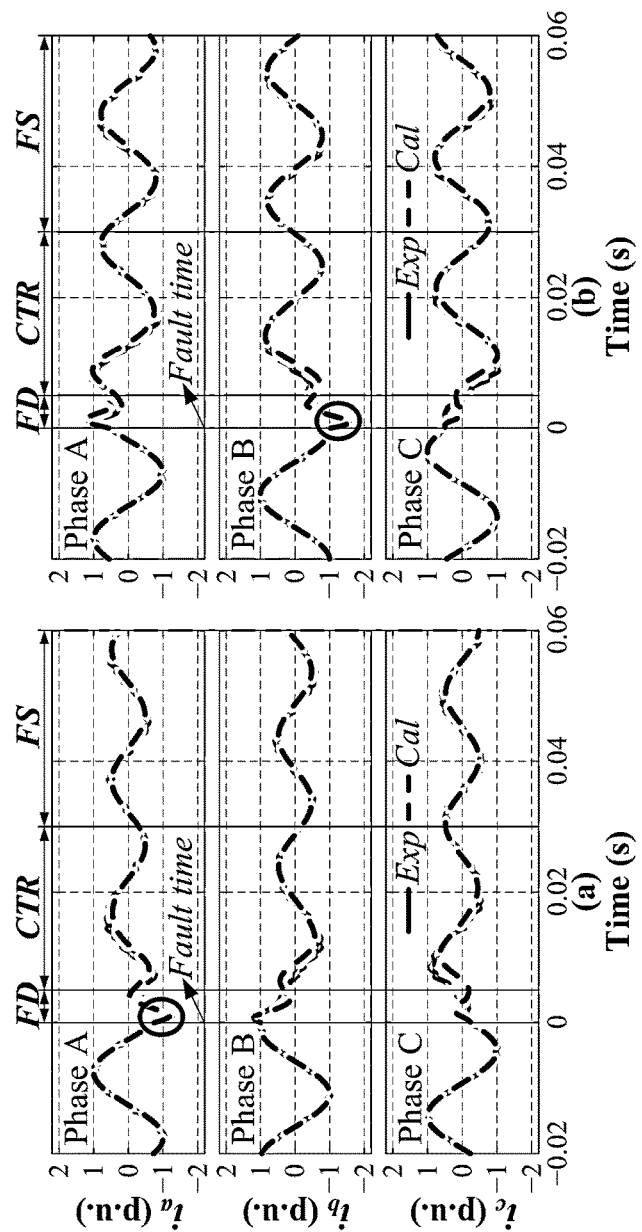
FIG. 14 shows a schematic diagram of comparisons between experimental results and calculation results under three-phase faults according to an embodiment of the present disclosure.
Figure 15:
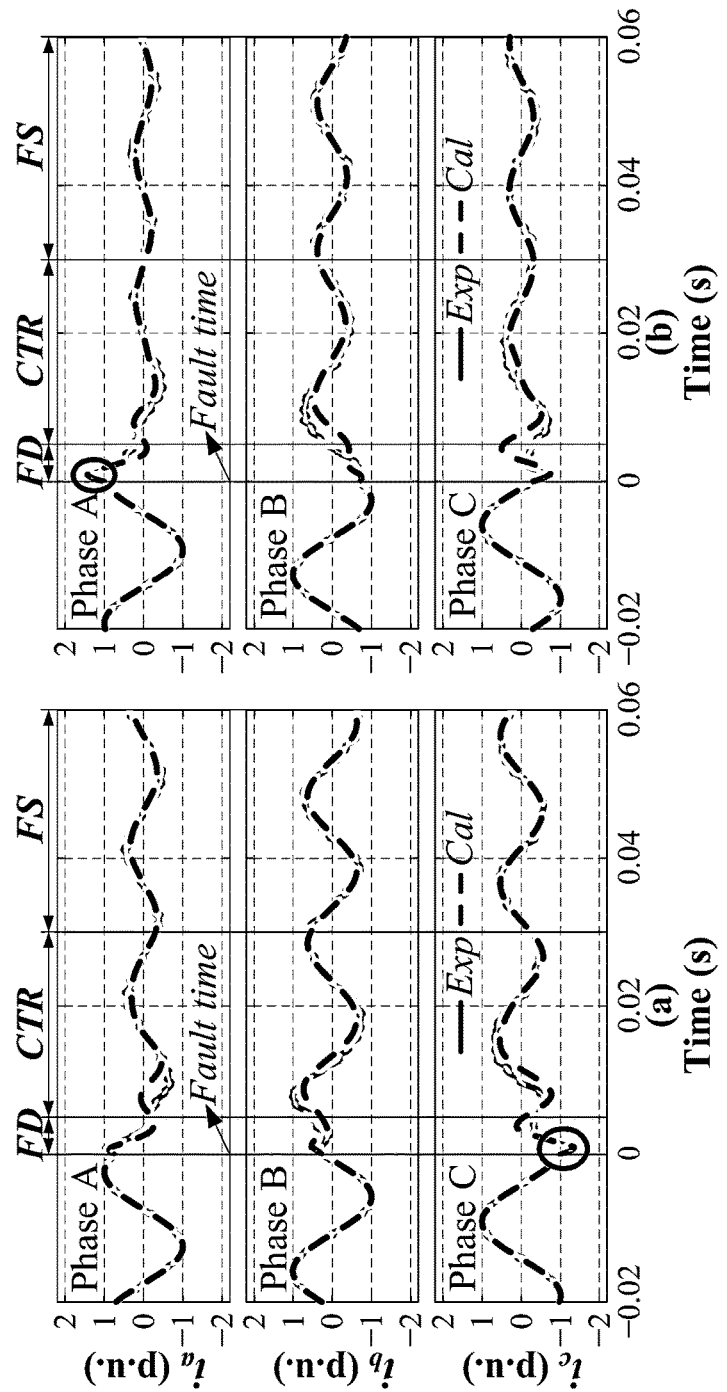
FIG. 15 shows a schematic diagram of comparisons between experimental results and calculation results under two-phase-to-ground (CAG) faults according to an embodiment of the present disclosure.

FIG. 14 shows a schematic diagram 1400 of comparisons between experimental results and calculation results under three-phase faults according to an embodiment of the present disclosure. The diagram (a) in FIG. 14 shows voltage dips to 0.4 p.u., and the diagram (b) in FIG. 14 shows voltage dips to 0.6 p.u.. FIG. 15 shows a schematic diagram 1500 of comparisons between experimental results and calculation results under two-phase-to-ground (CAG) faults according to an embodiment of the present disclosure. The diagram (a) in FIG. 15 shows phase voltage dips to 0.4 p.u., and the diagram (b) in FIG. 15 shows phase voltage dips to 0.6 p.u.. As illustrated, FIGS. 14-15 show comparisons between the experimental fault currents (labeled as Exp) and the calculation results (labeled as Cal) using the disclosed model under different fault conditions. Thereinto, the inrush currents are marked with purple circles. The peak value and peak time results of the inrush currents from FIGS. 14-15 are shown in TABLE II (the relative errors are marked with shadows).

TABLE II

PEAK VALUE AND PEAK TIME IN FIG. 14 AND FIG. 15

| | Peak value | | | Peak time | | |
|---|---|---|---|---|---|---|
| Case | Exp (p.u.) | Cal (p.u.) | Error (%) | Exp (ms) | Cal (ms) | Error (%) |
| FIG. 14(a) | 1.553 | 1.620 | −4.31 | 1 | 1 | 0 |
| FIG. 14(b) | 1.284 | 1.200 | 6.54 | 1 | 1 | 0 |
| FIG. 15(a) | 1.378 | 1.339 | 2.83 | 1 | 1 | 0 |
| FIG. 15(b) | 1.443 | 1.430 | 0.90 | 1 | 1 | 0 |

Figure 16:
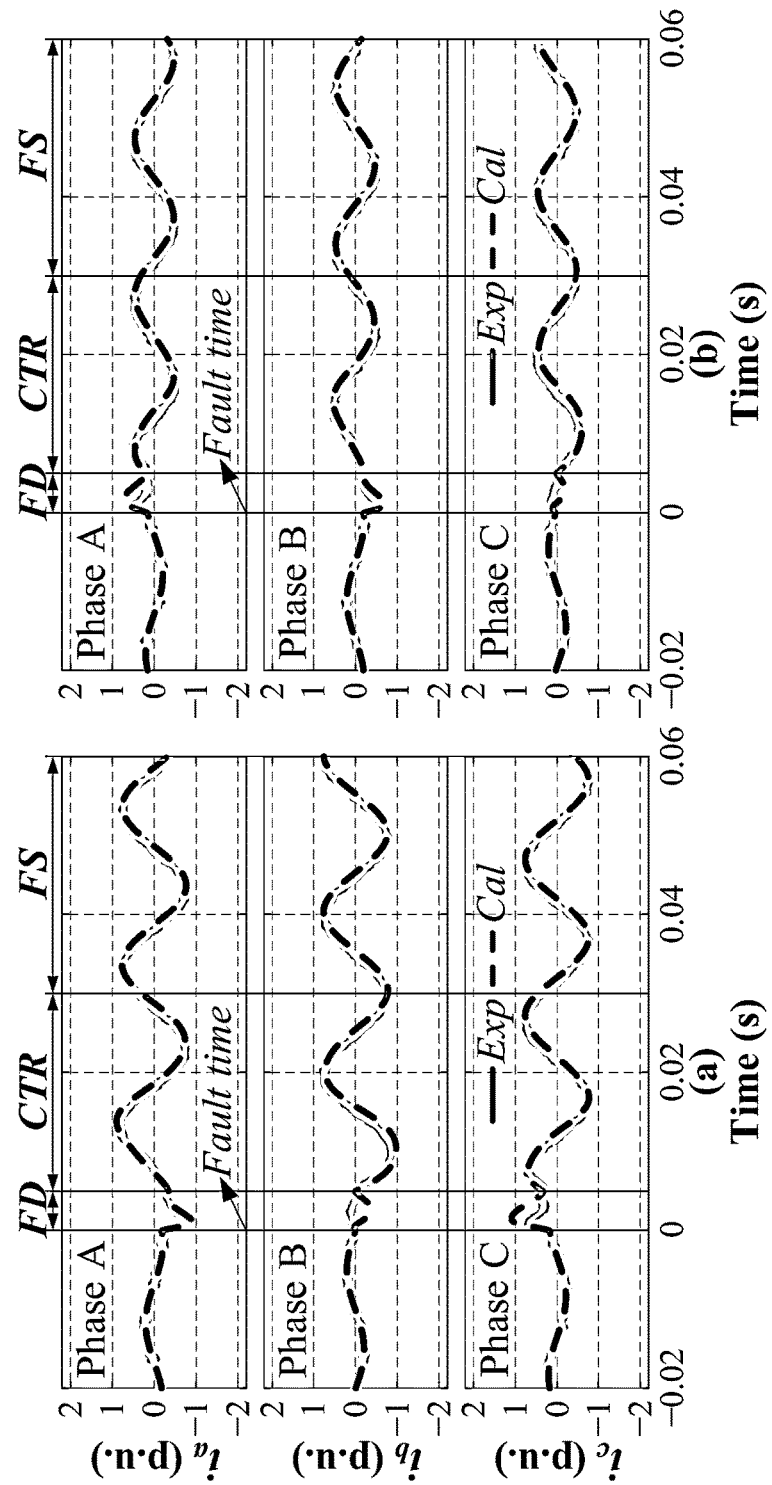
FIG. 16 shows a schematic diagram of comparisons between experimental results and calculation results under three-phase faults when pre-fault current is 0.2 p.u. according to an embodiment of the present disclosure.
Figure 17:
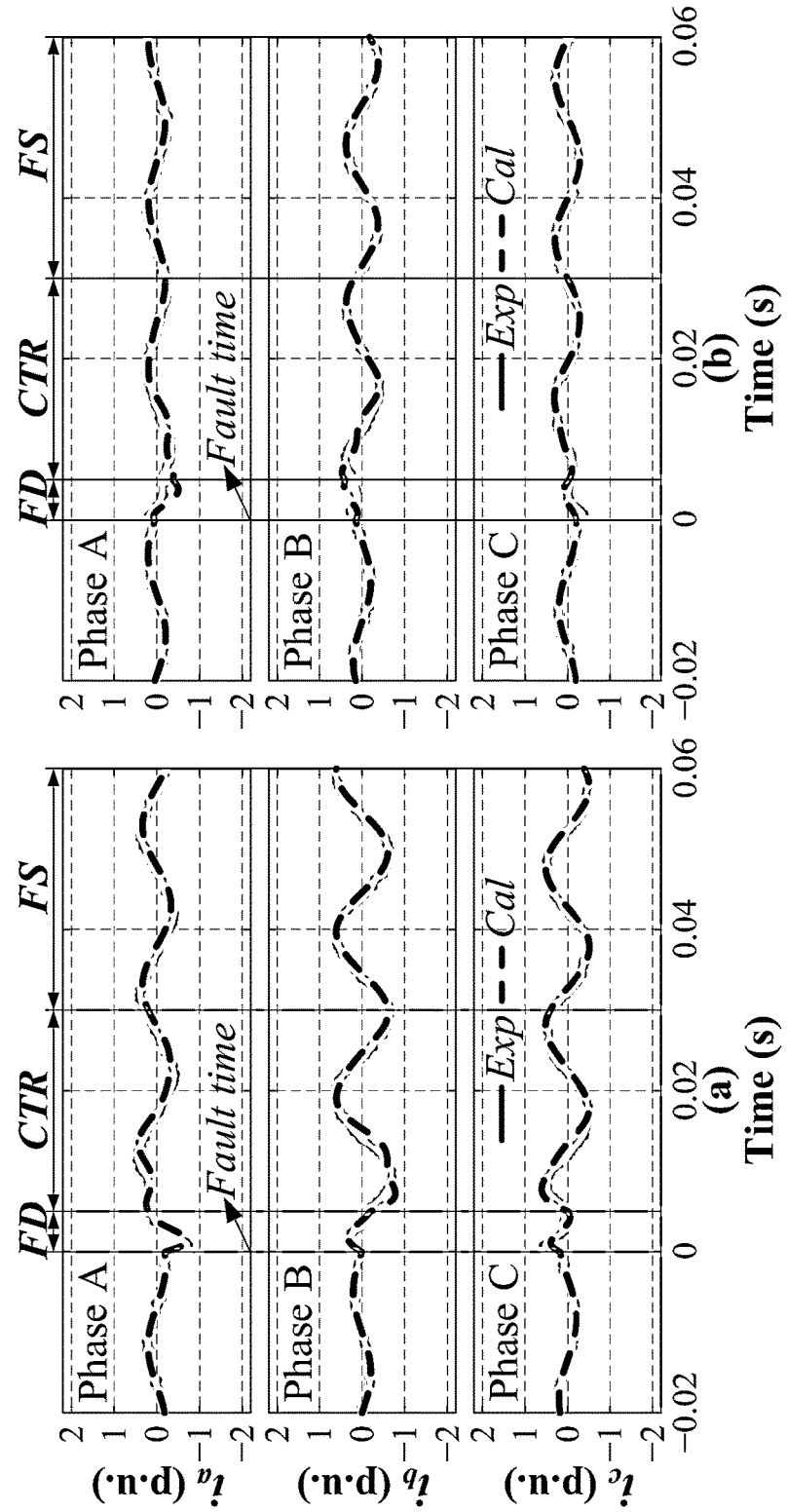
FIG. 17 shows a schematic diagram of comparisons between experimental results and calculation results under two-phase-to-ground faults when pre-fault current is 0.2 p.u. according to an embodiment of the present disclosure.

In practice, the output power of the IIRES may be very limited because of the environmental factors. Thus, it is also meaningful to test the disclosed model in a weak pre-fault output condition. FIGS. 16-17 present the results with the same fault conditions as FIGS. 14-15 but with a different pre-fault condition. FIG. 16 shows a schematic diagram 1600 of comparisons between experimental results and calculation results under three-phase faults when a pre-fault current is 0.2 p.u. according to an embodiment of the present disclosure. The diagram (a) in FIG. 16 shows voltage dips to 0.4 p.u., and the diagram (b) in FIG. 16 shows voltage dips to 0.6 p.u.. FIG. 17 shows a schematic diagram 1700 of comparisons between experimental results and calculation results under two-phase-to-ground faults when pre-fault current is 0.2 p.u. according to an embodiment of the present disclosure. The diagram (a) in FIG. 17 shows phase voltage dips to 0.4 p.u., and the diagram (b) in FIG. 17 shows phase voltage dips to 0.6 p.u.. Since the pre-fault output current is only 0.2 p.u., there is no inrush current in FIGS. 16-17.

It can be observed from the above results that the calculated fault currents coincide well with the experimental currents. Except for some errors caused by the simplification of the disclosed model, there are some inevitable errors attributed to the control hardware, such as the sampling errors and DSP truncation errors. Meanwhile, the harmonic currents are also critical influences in the practical tests.

C. Comparisons with the Existing Fault Models of IIRESs

To highlight the advantages of the disclosed model, a brief comparison between the disclosed model and other published IIRES fault models is presented in TABLE III. On this basis, advantages using the disclosed model can be summarized as: 1) This method provides an accurate theoretical model of IIRESs with DSC, which expands the fault analysis theory and facilitates the protection algorithm design; 2) The disclosed model fully considers multiple PNSCC structures employed in DSC, promising its generality for different manufactures; and 3) Three typical fault phases are covered in this model, and thus it can precisely estimate the fault response of IIRESs with DSC including the inrush current.

TABLE III

COMPARISONS BETWEEN THE PROPOSED MODEL WITH THE EXISTING IIRES FAULT MODELS

| Model in | Provide theoretical model | Support transient analysis | Control system | Consider PNSCC modes | Consider FD phase |
|---|---|---|---|---|---|
| Prior art 1 | Not | Yes | CSC, DSC | Yes | Yes |
| Prior art 2 | Yes | Not | CSC | Not | Not |
| Prior art 3 | Yes | Not | DSC | Not | Not |

TABLE III-continued

COMPARISONS BETWEEN THE PROPOSED MODEL
WITH THE EXISTING IIRES FAULT MODELS

| Model in | Provide theoretical model | Support transient analysis | Control system | Consider PNSCC modes | Consider FD phase |
|---|---|---|---|---|---|
| Prior art 4 | Yes | Yes | CSC | Not | Not |
| Prior art 5 | Yes | Yes | CSC, DSC | Not | Yes |
| Prior art 6 | Yes | Yes | DSC | DSOGI | Not |
| Disclosed | Yes | Yes | DSC | Five basic modes | Yes |

VI. CONCLUSION

The present disclosure discloses a theoretical fault analysis model of an IIRES that fully considers DSC. The high-order and coupled DSC system complicates the fault characteristics of IIRESs. Thus, a practical reduced-order fault model of IIRESs with DSC is established in different fault phases using an order reduction method. Main observations and analysis results show that the PNSCC mode and FD phase are the most critical elements introducing the inrush current to the fault response. Thereinto, the peak response of the inrush current varies with different types of PNSCC modes. Taking the IIRES with a DSRF-based PNSCC mode as an example, a serious voltage dip increases the peak value of the inrush current, yet it has no impacts on the peak time. For the cutoff frequency of the current loop, it is negatively correlated with the peak response of the inrush current. In addition, the peak value and peak time of the inrush current tend to be constant with an extending FD duration. Based on the disclosed model, fault responses of IIRESs with DSC in all the above cases can be precisely characterized with calculation errors less than 7%. Therefore, the disclosed method can provide an accurate theoretical model for the short-circuit analysis and protection algorithm. The disclosed model sheds analytical insights into fault responses of IIRESs with DSC, and thus, its mathematical expressions can be utilized to design the enhanced fault-ride-through control of IIRESs to suppress the inrush current. Moreover, novel principle of the line protection can be developed in accordance with the typical mathematical elements covered in the disclosed model.

VII. TECHNICAL IMPLEMENTATION OF THE DISCLOSED METHOD

Figure 18:
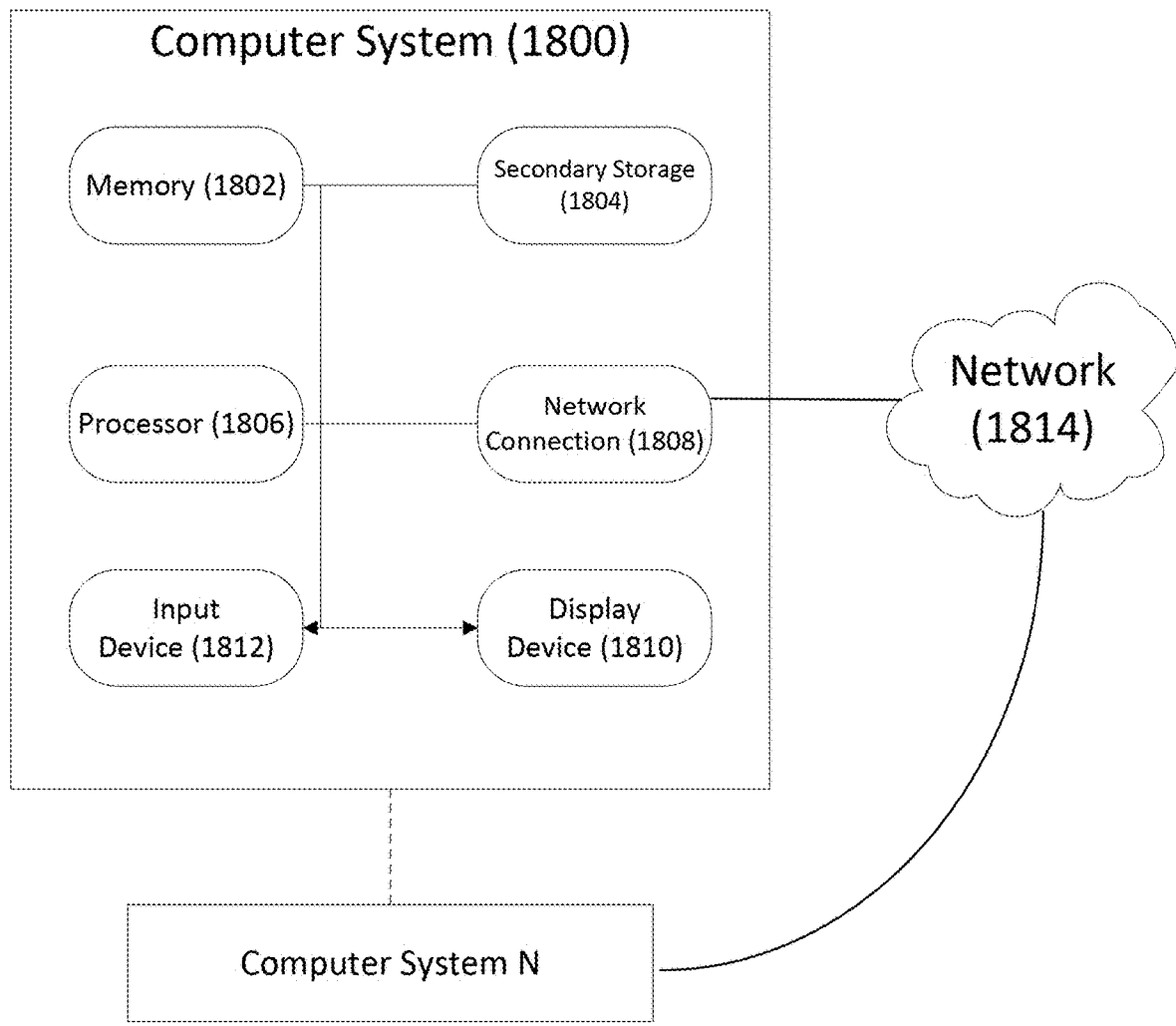
FIG. 18 shows illustrates an exemplary computer system that can be used to implement the disclosed method partially or wholly, according to an embodiment of the present disclosure.

In some embodiments, the system disclosed herein may comprise a computer system to implement the disclosed method. FIG. 18 illustrates an exemplary computer system 1800 that can be used to implement the disclosed method partially or wholly. The computer system 1800, or other computer systems similarly configured, may include and execute one or more subsystem components to perform functions described herein, including the steps/blocks of various processes, measurements and/or analyses described above. Likewise, a mobile device, a cell phone, a smartphone, a laptop, a desktop, a notebook, a tablet, a wearable device, a server, etc., which includes some of the same components of the computer system 1800, may run an application (or software) and perform the steps and functionalities described above. The computer system 1800 may connect to a network 1814, e.g., Internet, or other network, to receive inquiries, obtain data, and/or transmit information as described above.

The computer system 1800 typically includes a memory 1802, a secondary storage device 1804, and a processor 1806. The computer system 1800 may also include a plurality of processors 1806 and be configured as a plurality of, e.g., bladed servers, or other known server configurations. The computer system 1800 may also include a network connection device 1808, a display device 1810, and an input device 1812.

The memory 1802 may include RAM or similar types of memory, and it may store one or more applications for execution by the processor 1806. The secondary storage device 1804 may include a hard disk drive, floppy disk drive, CD-ROM drive, or other types of non-volatile data storage. The processor 1806 executes the application(s), such as those described herein, which are stored in the memory 1802 or secondary storage 1804, or received from the Internet or other network 1814. The processing by processor 1806 may be implemented in software, such as software modules, for execution by computers or other machines. These applications preferably include instructions executable to perform the system and subsystem component functions and methods described above and illustrated in the Figs. herein. The applications preferably provide graphical user interfaces (GUIs) through which users may view and interact with the subsystem components.

The computer system 1800 may store one or more database structures in the secondary storage 1804, for example, for storing and maintaining the information/data necessary to perform the above-described functions. Alternatively, such information/data may be in storage devices separate from these components.

Also, as noted, the processor 1806 may execute one or more software applications to provide the functions described in this specification, specifically to execute and perform the steps and functions in the process flows, measurements and/or analyses described above. The GUIs may be formatted, for example, as web pages in HyperText Markup Language (HTML), Extensible Markup Language (XML) or in any other suitable form for presentation on a display device depending upon applications used by users to interact with the computer system 1800.

The input device 1812 may include any device for entering information into the computer system 1800, such as a touch-screen, keyboard, mouse, cursor-control device, microphone, digital camera, video recorder or camcorder. The input and output device 1812 may be used to enter information into GUIs during performance of the methods described above. The display device 1810 may include any type of device for presenting visual information such as, for example, a computer monitor or flat-screen display (or mobile device screen). The display device 1810 may display the GUIs and/or output from sub-system components (or software).

Examples of the computer system 1800 include dedicated server computers, such as bladed servers, personal computers, laptop computers, notebook computers, palm top computers, network computers, mobile devices, or any processor-controlled device capable of executing a web browser or other type of application for interacting with the system.

Although only one computer system 1800 is shown in detail, the computer system 1800 may use multiple computer systems or servers as necessary or desired to support the users and may also use back-up or redundant servers to prevent network downtime in the event of a failure of a particular server. In addition, although the computer system 1800 is depicted with various components, one skilled in the art will appreciate that the computer system 1800 can contain additional or different components. In addition, although aspects of an implementation consistent with the above are described as being stored in a memory, one skilled in the art will appreciate that these aspects can also be stored on or read from other types of computer program products or computer-readable media, such as secondary storage devices, including hard disks, floppy disks, or CD-ROM; or other forms of RAM or ROM. The computer-readable media may include instructions for controlling the computer system 1800, to perform a particular method, such as methods described above.

Throughout the specification and the claims, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "some examples," "other examples," "one example," "an example," "various examples," "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrases "in one example," "in one embodiment," or "in one implementation" does not necessarily refer to the same example, embodiment, or implementation, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims The present disclosure is not to be limited in terms of the particular embodiments described in this application, which are intended as illustrations of various aspects. Many modifications and variations can be made without departing from its spirit and scope, as may be apparent. Functionally equivalent methods and apparatuses within the scope of the disclosure, in addition to those enumerated herein, may be apparent from the foregoing representative descriptions. Such modifications and variations are intended to fall within the scope of the appended representative claims. The present disclosure is to be limited only by the terms of the appended representative claims, along with the full scope of equivalents to which such representative claims are entitled. It is also to be understood that the terminology used herein is for the purpose of describing particular embodiments only, and is not intended to be limiting.

APPENDIX

TABLE A I

SIMULATION PARAMETERS OF THE IIRES MODEL

| Type | Parameters | Value | |
|---|---|---|---|
| Converter | Rated power | 0.5 | MW |
| | Rated AC voltage/frequency | 0.69 | kV/50 Hz |
| | Voltage of DC source | 1.2 | kV |
| | DC capacitor | 6000 | μF |
| | Proportional gain of current loop | 0.123 | p.u. |
| | Integral gain of current loop | 0.396 | p.u. |
| | Total inductance of LC filter | 0.31 | mH |
| | Total resistance of LC filter | 1 | mΩ |
| | Capacitance of LC filer | 50 | uF |
| Transformer | Ratio | 0.69/35 | kV |
| | Leakage reactance | 0.01 | p.u. |
| AC grid | Rated voltage | 35 | kV |
| | Grid inductance | 0.01 | H |

TABLE A II

PARAMETERS OF THE TEST SYSTEM

| Parameters | Value |
|---|---|
| Rated power of IIRES | 500 KW |
| Rated AC voltage/frequency | 0.315 kV/50 Hz |
| Type of PNSCC mode | DSRF |
| Voltage of DC source | 600 V |
| Proportional gain of current loop | 0.42 |
| Integral gain of current loop | 6 |
| Inductance of LC filter | 0.1 mH |
| Resistance of LC filter | 1 mΩ |
| Capacitance of LC filer | 3*300 μF (delta) |
| Sampling frequency | 20 kHz |
| Digital signal processing (DSP) | TMS320F28377D |
| Field programmable gate array (FPGA) | EPM1270T14415N |

What is claimed is:

1. A method for controlling an inverter-interfaced renewable energy source (IIRES), wherein the IIRES includes a converter, a decoupled sequence control (DSC) system and a power filter, and the DSC system includes a current controller, a low-voltage ride-through (LVRT) control unit, and a positive and negative sequence components calculation (PNSCC) structure including a dual synchronous reference frame (DSRF)-based PNSCC structure, a dual complex-coefficient filter (DCCF)-based PNSCC structure; a dual second-order generalized integrator (DSOGI)-based PNSCC structure, a delayed signal cancellation (dsc)-based PNSCC structure, and a notch filter (NF)-based PNSCC structure, the method comprising:

determining the PNSCC structures in a synchronous reference frame (SRF), as $$\hat{X}_{dq}(s) = H^{\varphi}(s)X_{dq}(s) = \begin{bmatrix} H_{11} & L & H_{14} \\ M & O & M \\ H_{41} & L & H_{44} \end{bmatrix} X_{dq}(s); \quad (4)$$

where s is a Laplace operator, $X_{dq}(s) = [X_d^+(s), X_d^-(s), X_q^-(s), X_q^-(s)]^T$ denotes a value of the grid current, an inverter output voltage or a terminal voltage, $\hat{X}_{dq}(s) = [\hat{X}_d^+(s), \hat{X}_q^+(s), \hat{X}_d^-(s), \hat{X}_q^-(s)]^T$ represents an estimated value of $X_{dq}(s)$, which is extracted by the PNSCC, $H^{\varphi}(s)$ is an objective transfer function of PNSCC, $H_{11} \sim H_{44}$ are elements of $H^{\varphi}(s)$ $H_{22}=H_{33}=H_{44}=H_{11}$, $H_{21}=H_{34}=-H_{43}=-H_{12}$, $H_{31}=H_{42}=H_{24}=H_{13}$, and $H_{41}=-H_{32}=-H_{23}=H_{14}$, and superscript $\varphi \in \{DSRF, DCCF, DSOGI, dsc, NF\}$;

determining transfer function $H^{DSRF}(s)=H^{DCCF}(s)$ for the DSRF-based PNSCC structure and the DCCF-based PNSCC structure, as $$H_{11} = \frac{\omega_p s^3 + 2\omega_p^2 s^2 + 4\omega^2 \omega_p s + 4\omega^2 \omega_p^2}{s^4 + 4\omega_p s^3 + 4(\omega^2 + \omega_p^2)s^2 + 8\omega^2 \omega_p s + 4\omega^2 \omega_p^2} \quad (10)$$

$$H_{12} = \frac{-2\omega\omega_p^2 s}{s^4 + 4\omega_p s^3 + 4(\omega^2 + \omega_p^2)s^2 + 8\omega^2 \omega_p s + 4\omega^2 \omega_p^2}$$

$$H_{13} = \frac{(s + 2\omega_p)\omega_p s^2}{s^4 + 4\omega_p s^3 + 4(\omega^2 + \omega_p^2)s^2 + 8\omega^2 \omega_p s + 4\omega^2 \omega_p^2}$$

$$H_{14} = \frac{2(s + \omega_p)\omega\omega_p s}{s^4 + 4\omega_p s^3 + 4(\omega^2 + \omega_p^2)s^2 + 8\omega^2 \omega_p s + 4\omega^2 \omega_p^2}$$

where $\omega_p$ is a cutoff frequency of an adopted low-pass filter in the DSRF- or DCCF-based PNSCC, and $\omega=100\pi$;

determining transfer function $H^{DSOGI}(s)$ for the DSOGI-based PNSCC structure, as $$H_{11} = \frac{k\omega s^3 + k^2 \omega^2 s^2 + 4k\omega^3 s + 2k^2 \omega^4}{2s^4 + 4k\omega s^3 + 2(k^2 + 4)\omega^2 s^2 + 8k\omega^3 s + 2k^2 \omega^4} \quad (11)$$

$$H_{12} = \frac{-k^2 \omega^3 s}{2s^4 + 4k\omega s^3 + 2(k^2 + 4)\omega^2 s^2 + 8k\omega^3 s + 2k^2 \omega^4}$$

$$H_{13} = \frac{k\omega(s + k\omega)s^2}{2s^4 + 4k\omega s^3 + 2(k^2 + 4)\omega^2 s^2 + 8k\omega^3 s + 2k^2 \omega^4}$$

$$H_{14} = \frac{k\omega(2s + k\omega)\omega s}{2s^4 + 4k\omega s^3 + 2(k^2 + 4)\omega^2 s^2 + 8k\omega^3 s + 2k^2 \omega^4}$$

where k is a constant parameter used in DSOGI:

determining transfer function $H^{dsc}(s)$ for the dsc-based PNSCC structure, as $$H_{11} = \frac{1 + e^{-sT}}{2}, H_{12} = 0, H_{13} = \frac{H_{11} s^2}{s^2 + 4\omega^2}, H_{14} = \frac{H_{11} 2\omega s}{s^2 + 4\omega^2} \quad (13)$$

$$H_{22} = H_{33} = H_{44} = H_{11}, H_{21} = H_{34} = -H_{43} = -H_{12}$$

$$H_{31} = H_{42} = H_{24} = H_{13}, H_{41} = -H_{32} = -H_{23} = H_{14}$$

where $T=T_g/4$ and $T_g$ is a time cycle of the grid voltage;

determining transfer function $H^{NF}(s)$ for the NF-based PNSCC structure, as $$H_{11} = NF(s), H_{12} = 0, H_{13} = \frac{H_{11} s^2}{s^2 + 4\omega^2}, H_{14} = \frac{H_{11} 2\omega s}{s^2 + 4\omega^2} \quad (15)$$

$$H_{22} = H_{33} = H_{44} = H_{11}, H_{21} = H_{34} = -H_{43} = -H_{12}$$

$$H_{31} = H_{42} = H_{24} = H_{13}, H_{41} = -H_{32} = -H_{23} = H_{14}$$

where NF(s) denotes a transfer function of a notch filter, and $NF(s)=(s^2+\omega_{NF}^2)/(s^2+2k_{NF}\omega_{NF}S+\omega_{NF}^2)$, $k_{NF}$ and $\omega_{NF}$ are constant parameters used in the notch filter;

determining from the equations (4), (10), (11), (13) and (15) a fault equation of the IIRES with the DSC, as $$I_{dq}(s) = G_m^{-1}(s)(PI(s)JI_{dq}*(s)+(H^{\varphi}(s)-J)E_{dq}(s)) \quad (18);$$

where $I_{dq}(s)$, $I_{dq}*(s)$ and $E_{dq}(s)$ denote a grid current equation, a grid current reference equation and a terminal voltage equation in a frequency domain, respectively, PI(s) is a transfer function of a proportional-integral controller, $PI(s)=(k_p+k_i/s)$, $k_p$ and $k_i$ are a proportional gain and an integral gain, $G_m(s)$ is a 4×4 matrix covering $G_{11} \sim G_{44}$, $G_{11}=PI(s)H_{11}+P_d(s)+\omega LH_{21}$, $G_{12}=PI(s)H_{12}+\omega L(H_{22}-1)$, $G_{13}=PI(s)H_{13}+\omega LH_{23}$, $G_{14}=PI(s)H_{14}+\omega LH_{24}$, and $G_{22}=G_{33}=G_{44}=G_{11}$, $G_{21}=G_{34}=-G_{43}=-G_{12}$, $G_{31}=G_{42}=G_{24}=G_{13}$, and $G_{41}=-G_{32}=-G_{23}=G_{14}$, $P_d(s)$ is a damping term attributed to a power filter and $P_d(s)=(Ls+R)$, R and L are total resistance and total inductance of the power filter, J is an identity matrix;

using the transfer functions $H^{DSRF}(s)$, $H^{DCCF}(s)$, $H^{DSOGI}(s)$, $H^{dsc}(s)$ and $H^{NF}(s)$, determining from the equation (4) an equation of the PNSCC structures in the SRF, as $$\hat{X}_{dq}(s) \approx H_S^{\varphi}(s)X_{dq}(s) = \frac{\omega_f}{s + \omega_f} JX_{dq}(s); \quad (23)$$

where a cutoff frequency $\omega_f$ depends on a type of the PNSCC structure;

from the equations (18) and (23) and by using an inverse Laplace transform, determining a fault equation of the IIRES with the DSC in a fault detection phase, as $$i_{d_{FD}}^+(t) = \frac{Ae^{-(t-t_0)/\tau}}{R} + \frac{e^{-\xi\omega_n(t-t_0)}}{RM}\sin(\omega_n M(t-t_0)+\varphi_1) \quad (25)$$

$$\varphi_1 = \arctan(M/(\omega_n \tau - \xi)), t_0 \le t \le t_c$$

where $i_{d_{FD}}^+(t)$ is a time-domain positive-sequence grid current equation in a fault detection phase, $1/\tau=R/L$, $\omega_n=(\omega_c\omega_f)^{1/2}$, $\zeta=\omega_n/(2\omega_c)$, $M=(1-\zeta^2)^{1/2}$, $1/A=(\omega_n-\tau)^2+M^2$, and $\omega_c$ is an open-loop cutoff frequency of a current control loop, $\omega_c=k_p/L=k_i/R$, $\varphi_1$ is an initial phase angle of $i_{d_{FD}}^+(t)$, $t_0$ is a fault time, and $t_c$ is an end time of the fault detection phase;

from the equations (18) and (23) and by using an inverse Laplace transform, determining a fault equation of the IIRES with the DSC in a control transient response (CTR) phase, as $$i_{d_{CTR}}^+(t) = 1 + \frac{e^{-\xi\omega_n(t-t_c)}}{2\xi M}\sin(\omega_n M(t-t_c)+\varphi_2) + i_{d_{FD}}^+(t) \quad (27)$$

$$\varphi_2 = \arctan(2\xi M/(2\xi^2 - 1)), t_c \le t \le t_f$$

where $i_{d_{CTR}}^{+}(t)$ is a time-domain positive-sequence grid current equation in a control transient response phase, $\varphi_2$ is an initial phase angle of $i_{d_{CTR}}^{+}(t)$, and $t_f$ is a start time of a fault steady phase;

detecting a short-circuit fault by the converter and analyzing the short-circuit fault using the equation (25);

switching the DSC system from a first mode to a current control mode through the LVRT unit by the current controller, and analyzing the short-circuit fault using the equation (27); and suppressing an inrush current to protect the IIRES, wherein the inrush current is a maximum fault current with a peak value exceeding $I_{lim}$, which is caused by the existence of PNSCC structure as determined by equation (23) and an fault detection phase.

* * * * *